US010607419B2

United States Patent
Os et al.

(10) Patent No.: US 10,607,419 B2
(45) Date of Patent: Mar. 31, 2020

(54) AVATAR EDITING ENVIRONMENT

(71) Applicant: Apple Inc., Cupertino, CA (US)

(72) Inventors: Marcel Van Os, San Francisco, CA (US); Thomas Goossens, Paris (FR); Laurent Baumann, Campbell, CA (US); Michael Dale Lampell, Woodside, CA (US); Alexandre Carlhian, Paris (FR)

(73) Assignee: Apple Inc., Cupertino, CA (US)

( * ) Notice: Subject to any disclaimer, the term of this patent is extended or adjusted under 35 U.S.C. 154(b) by 654 days.

(21) Appl. No.: 14/866,560

(22) Filed: Sep. 25, 2015

(65) Prior Publication Data

US 2016/0086387 A1 Mar. 24, 2016

Related U.S. Application Data

(63) Continuation of application No. 13/082,035, filed on Apr. 7, 2011, now Pat. No. 9,576,400.

(Continued)

(51) Int. Cl.
*G06T 19/20* (2011.01)
*G06T 13/40* (2011.01)
(Continued)

(52) U.S. Cl.
CPC ............ *G06T 19/20* (2013.01); *G06F 3/0482* (2013.01); *G06F 3/04812* (2013.01);
(Continued)

(58) Field of Classification Search
CPC ...... A63F 2300/5553; A63F 2300/8082; A63F 2300/407; A63F 2300/513;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

EP 1429291 6/2004
JP 2000-163031 6/2000
(Continued)

OTHER PUBLICATIONS

International Preliminary Report on Patentability issued in PCT/US2011/031616 dated Oct. 9, 2012, 6 pages.
(Continued)

*Primary Examiner* — Edward Martello
(74) *Attorney, Agent, or Firm* — Fish & Richardson P.C.

(57) ABSTRACT

An avatar editing environment is disclosed that allows users to create custom avatars for use in online games and other applications. Starting with a blank face the user can add, rescale and position different elements (e.g., eyes, nose, mouth) on the blank face. The user can also change the shape of the avatar's face, the avatar's skin color and the color of all the elements. In some implementations, touch input and gestures can be used to manually edit the avatar. Various controls can be used to create the avatar, such as controls for resizing, rotating, positioning, etc. The user can choose between manual and automatic avatar creation. The avatar editing environment can be part of a framework that is available to applications. One or more elements of the avatar can be animated.

20 Claims, 21 Drawing Sheets

Related U.S. Application Data

(60) Provisional application No. 61/321,840, filed on Apr. 7, 2010.

(51) Int. Cl.

| | | |
|---|---|---|
| *G06F 3/0482* | (2013.01) | |
| *G06T 11/00* | (2006.01) | |
| *G06F 3/0481* | (2013.01) | |
| *G06T 11/60* | (2006.01) | |
| *G06F 3/0484* | (2013.01) | |
| *G06F 3/0488* | (2013.01) | |
| *G06T 15/04* | (2011.01) | |

(52) U.S. Cl.
CPC ...... *G06F 3/04817* (2013.01); *G06F 3/04845* (2013.01); *G06F 3/04883* (2013.01); *G06T 11/001* (2013.01); *G06T 11/60* (2013.01); *G06T 13/40* (2013.01); *G06T 15/04* (2013.01); *G06T 2200/24* (2013.01); *G06T 2219/2012* (2013.01); *G06T 2219/2016* (2013.01)

(58) Field of Classification Search
CPC ............... A63F 2300/572; A63F 13/10; A63F 2300/5546; A63F 2300/6018; A63F 2300/65; A63F 2300/6607; A63F 2300/556; A63F 13/00
See application file for complete search history.

(56) References Cited

U.S. PATENT DOCUMENTS

| | | | |
|---|---|---|---|
| 5,615,320 | A | 3/1997 | Lavendel |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,453,294 | B1 | 9/2002 | Dutta et al. |
| 6,545,682 | B1 | 4/2003 | Ventrella et al. |
| 6,690,376 | B1 | 2/2004 | Saito et al. |
| 6,690,387 | B2 | 2/2004 | Zimmerman et al. |
| 6,873,610 | B1 | 3/2005 | Noever |
| 7,015,894 | B2 | 3/2006 | Morohoshi |
| 7,184,064 | B2 | 2/2007 | Zimmerman et al. |
| 7,386,799 | B1 | 6/2008 | Clanton et al. |
| 7,484,176 | B2 | 1/2009 | Blattner et al. |
| 7,487,458 | B2 | 2/2009 | Jalon et al. |
| 7,603,413 | B1 | 10/2009 | Herold et al. |
| 7,636,755 | B2 | 12/2009 | Blattner et al. |
| 7,663,607 | B2 | 2/2010 | Hotelling et al. |
| 7,697,960 | B2 | 4/2010 | Seto et al. |
| 7,761,339 | B2 | 7/2010 | Alivandi |
| 7,827,495 | B2 | 11/2010 | Bells et al. |
| 7,895,049 | B2 | 2/2011 | O'Sullivan et al. |
| 7,908,554 | B1 | 3/2011 | Blattner |
| 7,921,066 | B2 | 4/2011 | Van Dyke et al. |
| 7,979,574 | B2 | 7/2011 | Gillo et al. |
| 8,026,918 | B1 | 9/2011 | Murphy |
| 8,037,147 | B1 | 10/2011 | Herold et al. |
| 8,047,988 | B2 | 11/2011 | Lee et al. |
| 8,088,044 | B2 | 1/2012 | Tchao et al. |
| 8,156,060 | B2 | 4/2012 | Borzestowski et al. |
| 8,234,218 | B2 * | 7/2012 | Robinson ........... G06Q 30/0222 705/14.23 |
| 8,250,144 | B2 | 8/2012 | Blattner et al. |
| 8,384,719 | B2 | 2/2013 | Reville et al. |
| RE44,054 | E | 3/2013 | Kim |
| 8,402,378 | B2 | 3/2013 | Blattner et al. |
| 8,439,750 | B2 | 5/2013 | Kawamoto |
| 8,473,848 | B2 | 6/2013 | Bells et al. |
| 8,479,122 | B2 | 7/2013 | Hotelling et al. |
| 8,692,830 | B2 | 4/2014 | Nelson et al. |
| 8,694,899 | B2 | 4/2014 | Goossens et al. |
| 2001/0050689 | A1 | 12/2001 | Park |
| 2002/0061781 | A1 | 5/2002 | Tonomura |
| 2003/0110450 | A1 | 6/2003 | Saki |
| 2005/0026685 | A1 | 2/2005 | Ruark |
| 2005/0078804 | A1 | 4/2005 | Yomoda |
| 2005/0143108 | A1 | 6/2005 | Seo et al. |
| 2005/0248574 | A1 | 11/2005 | Ashtekar et al. |
| 2006/0026521 | A1 | 2/2006 | Hotelling et al. |
| 2006/0059430 | A1 | 3/2006 | Bells et al. |
| 2006/0075053 | A1 | 4/2006 | Xu |
| 2006/0197753 | A1 | 9/2006 | Hotelling |
| 2006/0294465 | A1 | 12/2006 | Ronen et al. |
| 2007/0130001 | A1 | 6/2007 | Jung et al. |
| 2007/0162936 | A1 | 7/2007 | Stallings et al. |
| 2007/0171091 | A1 | 7/2007 | Nisenboim et al. |
| 2007/0260984 | A1 | 11/2007 | Marks et al. |
| 2007/0277109 | A1 | 11/2007 | Chen et al. |
| 2008/0163074 | A1 | 7/2008 | Tu |
| 2009/0015593 | A1 | 1/2009 | Kang et al. |
| 2009/0049392 | A1 | 2/2009 | Karttunen et al. |
| 2009/0144639 | A1 | 6/2009 | Nims et al. |
| 2009/0147008 | A1 | 6/2009 | Do et al. |
| 2009/0150778 | A1 | 6/2009 | Nicol, II |
| 2009/0175521 | A1 | 7/2009 | Shadan et al. |
| 2009/0237232 | A1 | 9/2009 | Gyorfi et al. |
| 2009/0254859 | A1 | 10/2009 | Arrasvuori et al. |
| 2009/0281925 | A1 | 11/2009 | Winter et al. |
| 2009/0300513 | A1 | 12/2009 | Nims et al. |
| 2010/0211899 | A1 | 8/2010 | Fujioka |
| 2010/0302395 | A1 | 12/2010 | Mathe et al. |
| 2011/0161837 | A1 | 6/2011 | Betzler et al. |
| 2011/0248992 | A1 | 10/2011 | van Os et al. |
| 2011/0252344 | A1 | 10/2011 | van Os |
| 2011/0292051 | A1 | 12/2011 | Nelson et al. |
| 2011/0296324 | A1 | 12/2011 | Goossens et al. |

FOREIGN PATENT DOCUMENTS

| | | |
|---|---|---|
| JP | 2002-342033 | 11/2002 |
| KR | 1020020042248 | 6/2002 |
| WO | WO 2007/120981 | 10/2007 |
| WO | WO 2009/133710 | 11/2009 |

OTHER PUBLICATIONS

Office Action in Taiwan Application No. 100111887 dated Oct. 7, 2013, 23 pages with English translation.

PCT Notification of Transmittal of the International Search Report and the Written Opinion for Application No. PCT/US2011/031616 dated Aug. 30, 2011, 9 pages.

U.S. Non-Final Office Action for U.S. Appl. No. 12/791,643 dated Jan. 20, 2012, 12 pages.

"Model Generation for an Intrusion Detection System Using Genetic Algorithms" Chittur, Adhitya, Nov. 27, 2001.

Amin, Alia K., et al., "The Sense MS: Enriching the SMS experience for Teens by Non-verbal Means", *Human-Computer Interaction—INTERACT 2005*, IFIP TC13 International Conference Proceedings, Rome, Italy, Sep. 12-16, 2005, pp. 962-965.

Free Photoshop Tutorials: Gradient Filter II at http://www.digiretus.com/tippek/cikkiro.php?SORSZAM=177 as of Mar. 28, 2009 (Photoshop).

Lee, S.K. et al. (Apr. 1985). "A Multi-Touch Three Dimensional Touch-Sensitive Tablet," Proceedings of CHI: ACM Conference on Human Factors in Computing Systems, DD. 21-25.

Maria del Puy Carretero et al., "Preserving Avator Genuineness in Different Display Media," Mobile Networks and Applications, vol. 13, No. 6, Jul. 15, 2008, pp. 627-634 (XP019647249).

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

The Mii Avatar Editor available at http://www.miisearch.com/mii-creator.html as of Jan. 7, 2010 (Mii Editor).

(56) References Cited

OTHER PUBLICATIONS

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

AVATAR EDITING ENVIRONMENT

CROSS-REFERENCE TO RELATED APPLICATIONS

This application claims the benefit of U.S. Provisional Application Ser. No. 61/321,840, filed on Apr. 7, 2010, under 35 U.S.C. § 119(e). The disclosure of the prior application is considered part of and is incorporated by reference in the disclosure of this application.

TECHNICAL FIELD

This disclosure relates generally to avatar creation for computer systems and other devices.

BACKGROUND

An avatar is representation of a user or their alter ego. An avatar is often in the form of a three-dimensional (3D) model used in computer games or a two-dimensional (2D) icon or picture used on Internet forums, social networks and other communities. Avatars can also be used in video games, including online interactive gaming environments.

Avatars in video games are the player's physical representation in the game world. Online games often provide means for creating varied and sophisticated avatars. In some online games, players can construct a customized avatar by selecting from a number of preset facial structures, hairstyles, skin tones, clothes, accessories, etc. (collectively referred to as "elements"). Once the preset elements are selected, there is no facility for allowing users to manually adjust the elements (e.g., resize or position elements).

SUMMARY

An avatar editing environment is disclosed that allows users to create custom avatars for use in online games and other applications. Starting with a blank face the user can add, rescale and position different elements on the blank face, including but not limited to different eyes, ears, mouth (including teeth and smile), nose, eyebrows, hair, beard, moustache, glasses, earrings, hats, and other elements that are associated with physical characteristics of humans and fashion. The user can also change the shape of the avatar's face, the avatar's skin color and the color of all the elements.

In some implementations, touch input and gestures can be used to edit the avatar. Various controls can be used to create the avatar, such as controls for resizing, rotating, positioning, etc. The user can choose between manual and automatic avatar creation. In some implementations, the avatar editing environment can be part of a framework that is available to applications, such as address books, text messaging, chat sessions, e-mail, games or any other applications. In some implementations, one or more elements of the avatar can be animated. For example, the avatar's eyes can be animated to track an object in a user interface or to indicate direction. In some implementations avatar data can be stored on a network so that the avatar can be used in online applications or downloaded to a variety of user devices at different user locations.

In some implementations, a computer implemented method includes: presenting an avatar editing environment on a display of a device; displaying a three-dimensional avatar model in the avatar editing environment; receiving first input selecting an avatar element category; receiving a second input selecting an avatar element from the avatar category; rendering the selected avatar element on the three-dimensional (3D) avatar model; and receiving third input for manually editing the avatar element.

Some embodiments include one or more application programming interfaces (APIs) in an environment with calling program code interacting with other program code being called through the one or more interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, and other types of invocations or parameters via the API.

The details of one or more implementations of an avatar editing environment are set forth in the accompanying drawings and the description below. Other features, aspects, and advantages of the avatar editing environment will become apparent from the description, the drawings, and the claims.

BRIEF DESCRIPTION OF THE DRAWINGS

Like reference symbols in the various drawings indicate like elements.

DETAILED DESCRIPTION

Overview of Avatar Editing Environment

FIGS. 1A-1E illustrate an exemplary avatar editing environment for creating custom avatars. In some implementations, a user of device 100 (e.g., a mobile device) can invoke an avatar editing application by selecting an icon on a homescreen or by selecting the application through a menu or other input mechanism. In some implementations, the avatar editing environment can be presented in a web page displayed in a browser of device 100. The web page can be served my a network service (e.g., a mobile service).

Upon invocation of the avatar editing environment, a user interface 104 for the editing environment can be presented on a display 102 of device 100. Display 102 can be a touch sensitive display or surface responsive to touch input and gestures. Although a mobile device is shown, device 100 can be a desktop computer, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these devices.

Figure 1A:
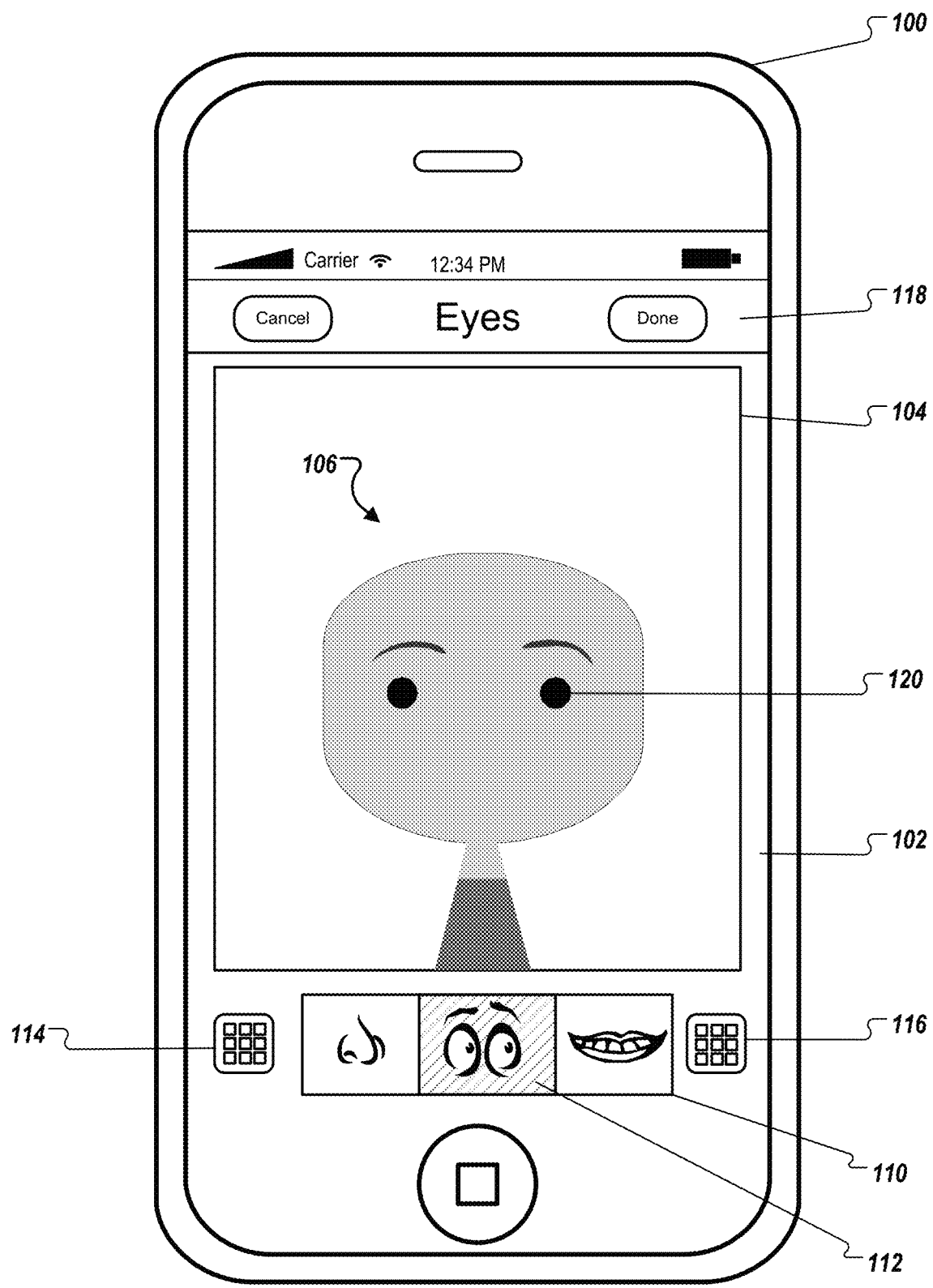
FIGS. 1A-1E illustrate an exemplary avatar editing environment for creating custom avatars.

Referring to FIG. 1A, in some implementations avatar 106 can be displayed on user interface 104. Avatar 106 can be a 2D or 3D avatar model. Avatar 106 can also be full body avatar. When the editing environment is invoked or the user is creating a new avatar, a default avatar can be displayed on user interface 104. In some implementations, the default avatar can have a blank face for receiving elements selected by the user in the editing environment. In other implementations, a default avatar having predefined elements can be displayed. The default avatar can be automatically created based on user preferences specified in a dialog. For example, when the user first invokes a game environment on device 100, the user can be presented with a number of predefined avatars and the user can select one as a default avatar. In other implementations, a default avatar can be automatically created on-the-fly based on user preferences for physical characteristics, such as gender, age, hair color, eye color, etc. Starting with a blank face the user can add different elements on the blank face, including but not limited to different eyes, ears, mouth (including teeth and smile), nose, eyebrows, hair, beard, moustache, glasses, earrings, hats, and other elements that are associated with physical characteristics of humans and fashion. The user can also change the shape of the avatar's face, the avatar's skin color and the color of all the elements.

Exemplary Category Picker

In the example shown, the user selected an "Eyes" category from category picker 110. Category picker 110 can be a bar with icons representing element categories. Text and other visual indicators of categories can also be used. The selected category can be the category having an icon in center position 112 of category picker 110. The icon in center position 112 can be highlighted or otherwise visually enhanced to indicate its selected status. In some implementations, the user can make a swipe gesture on the bar to the left or right to move a different icon into center position 112. In response to the swipe gesture, category picker 110 can be animated so that the category icons move like a wheel on a slot machine. Friction can also be simulated so that acceleration of the wheel can be controlled. For example, a faster gesture results in an increased acceleration of the icons passing through center position 112.

In the example shown, the "Eyes" category is currently occupying middle position 112 and is therefore highlighted to indicate its selected status. An element picker represented by icon 116 was used to select eyes element 120. Upon its selection, the eyes element 120 were added to the face of avatar 106, which was originally blank. The operation of the element picker is further described in reference to FIG. 2A.

Display 102 presents control region 118. Control region 118 can include text describing the currently selected category. For example, the currently selected "Eyes" category is indicated by the text "Eyes" in control region 118. Control region 118 can also include one or more controls (e.g., virtual buttons) for exiting the avatar editing environment. In the example shown, a first virtual button can cancel (e.g., exit) the avatar editing environment without saving changes to avatar 106 (e.g., "Cancel" button). Another button can be used to exit the avatar editing environment and save changes to avatar 106 (e.g., "Done" button).

A color picker represented by icon 114 can be selected to allow the user to select a color for the selected category. For example, if the "Eyes" category is selected, the color picker can be used to select a color for all the eyes elements that can be selected using element picker 116. The operation of the color picker will be further described in reference to FIG. 2B.

Figure 1B:
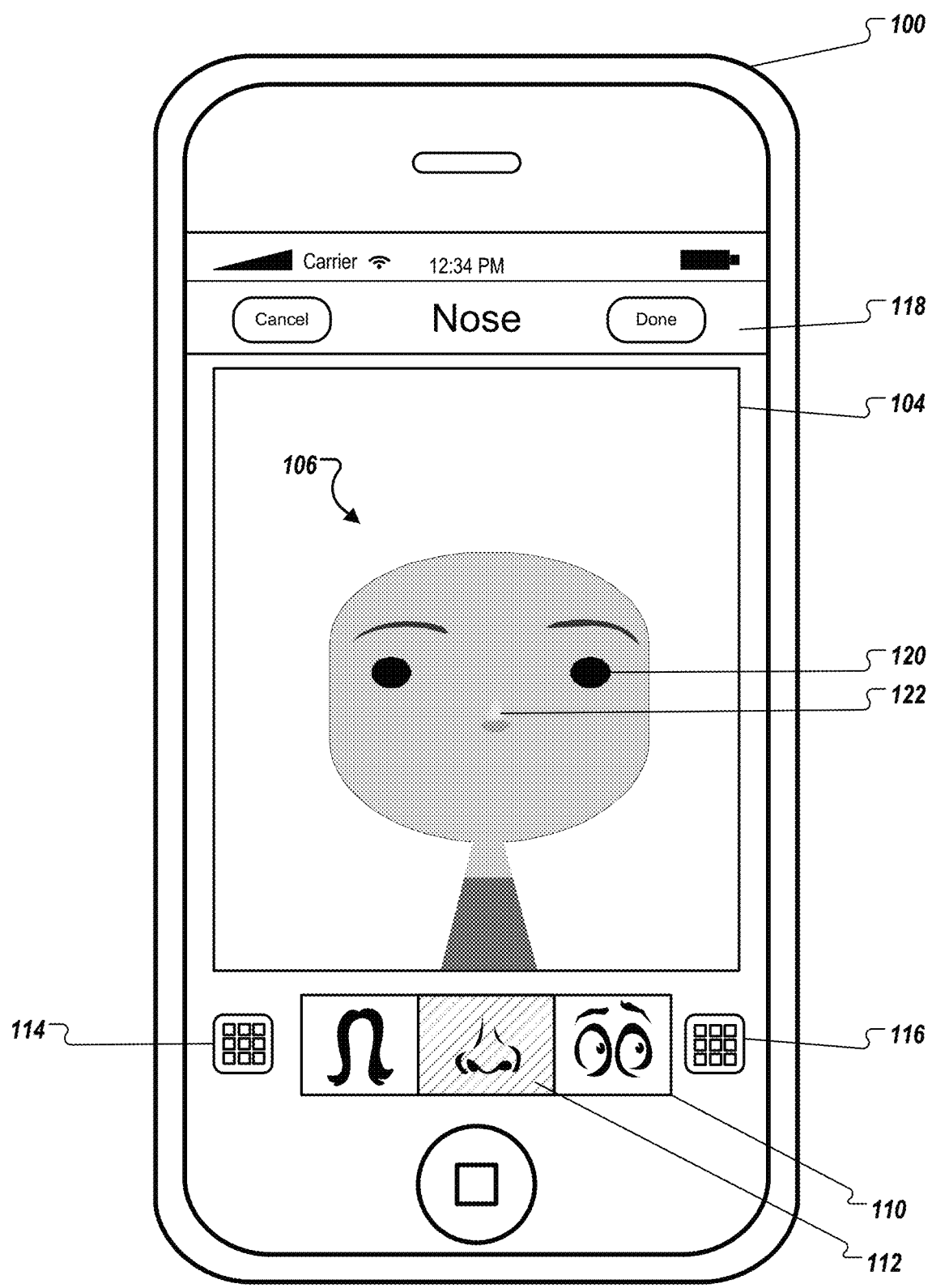

Referring to FIG. 1B, the user has selected a "Nose" category using category picker 110. The selection is indicated by an icon of a nose occupying center position 112 of category picker 110. Control region 118 indicates that the category "Nose" has been selected by displaying the text "Nose." The user selected nose element 122 from the element picker. Nose element 122 was automatically added to the face of avatar 106. The selected element category can be used to determine a default region on the avatar face to add the selected element from the category. In this case, the "Nose" category selection determined the location of nose element 122 to be the center of the avatar face.

Figure 1C:
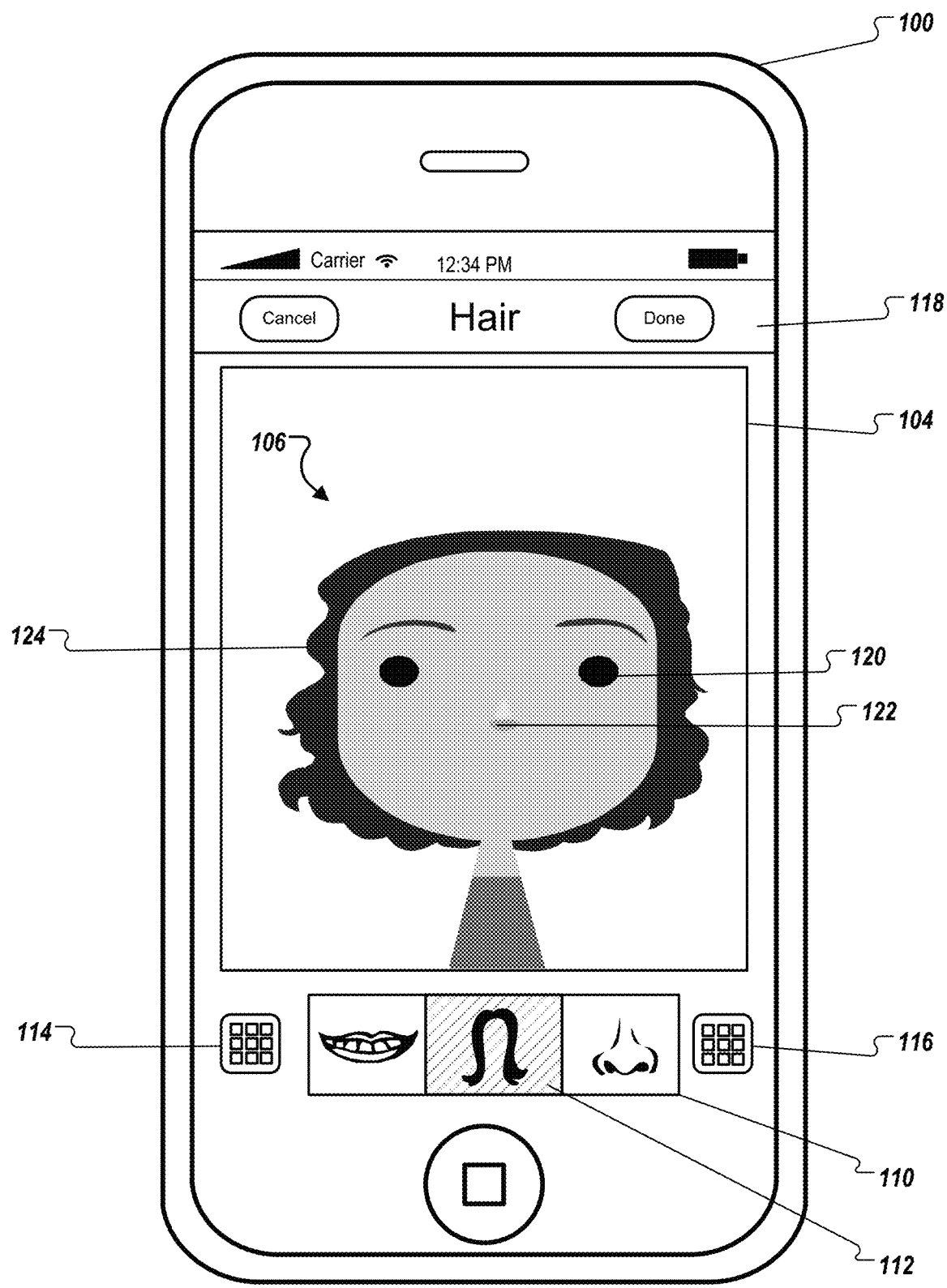

Referring to FIG. 1C, the user has selected a "Hair" category using category picker 110. The selection is indicated by an icon of hair occupying center position 112 of category picker 110. Control region 118 indicates that the element category "Hair" has been selected by displaying the text "Hair." The user selected hair element 124 from the element picker. Hair element 124 was automatically added to the avatar face. The "Hair" category selection determined the location of hair element 124 to be on top of the avatar head.

Figure 1D:
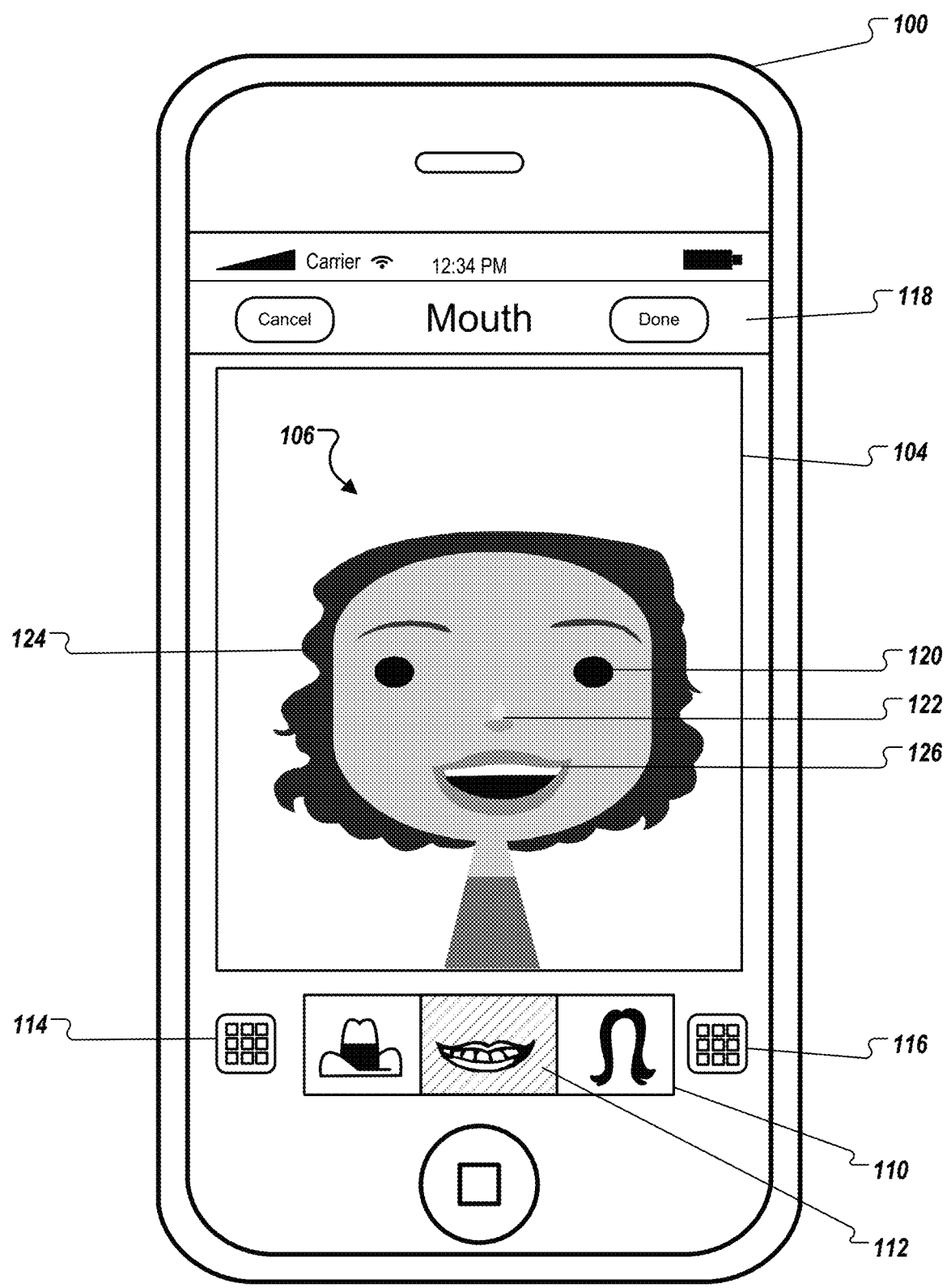

Referring to FIG. 1D, the user has selected a "Mouth" category using category picker 110. The selection is indicated by an image of a mouth occupying center position 112 of category picker 110. Control region 118 indicates that the element category "Mouth" has been selected by displaying the text "Mouth." The user selected mouth element 126 from the element picker. Mouth element 126 was automatically added to the avatar face. The "Mouth" category selection determined the location of mouth element 126 to be below nose element 122 on the avatar face.

Figure 1E:
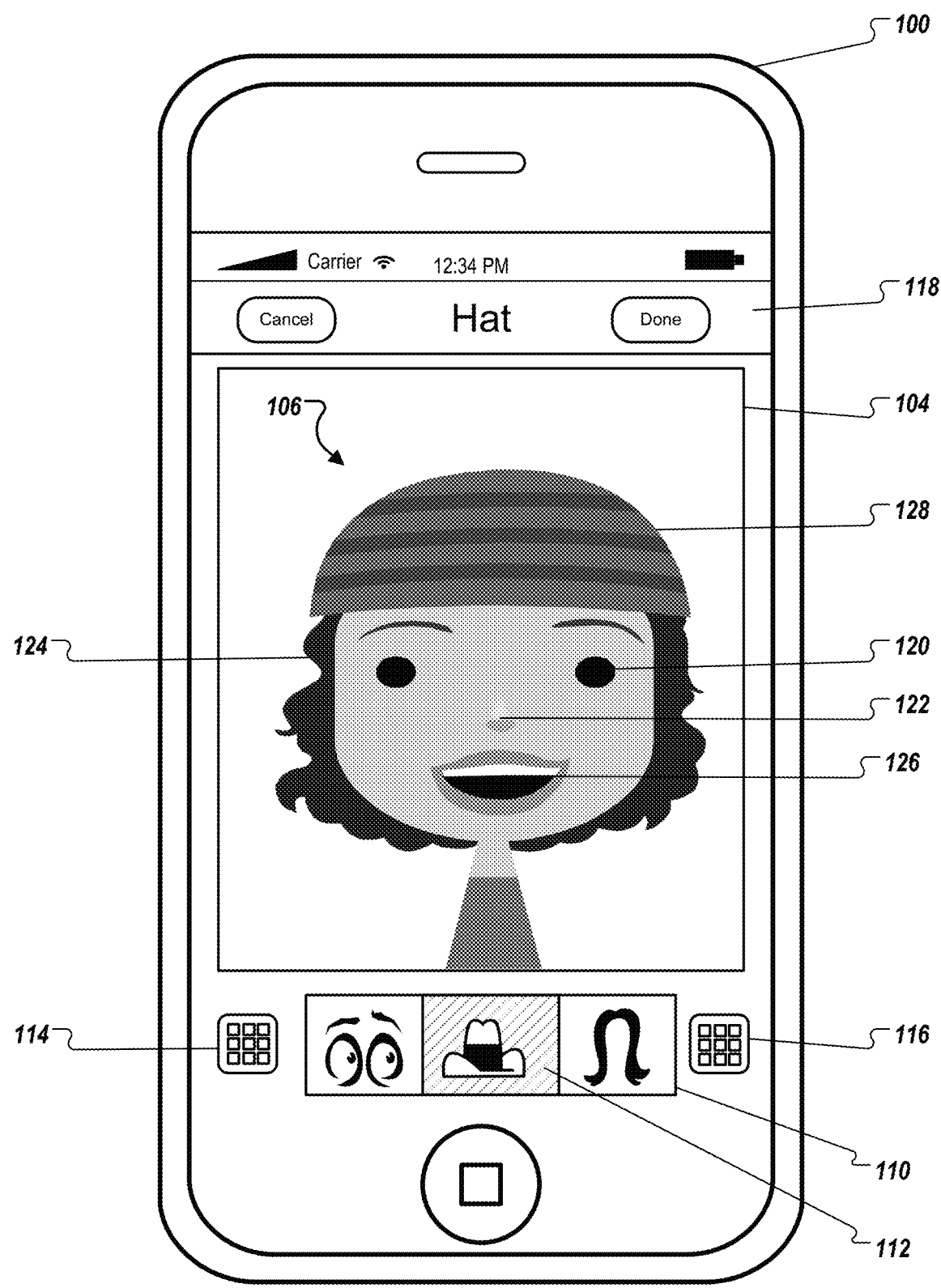

Referring to FIG. 1E, the user has selected a "Hat" category using category picker 110. The selection is indicated by an image of a hat occupying center position 112 of category picker 110. Control region 118 indicates that the category "Hat" has been selected by displaying the text "Hat." The user selected a hat element 128 from the element picker. Hat element 128 was automatically added to the avatar head. The "Hat" category selection determined the location of hat element 128 to be on top of hair element 124.

In FIGS. 1A-1E, the user selected eyes, nose, hair, mouth and a hat for avatar 106. In some implementations, the elements can be 2D textures, which are rendered onto a 3D model of the avatar head. In some implementations, the elements can be 3D objects that are rendered onto the 3D model of the avatar head. For example, a graphics engine can create "eye sockets" in the 3D model and insert 3D "eye" objects into the sockets. The 3D "eye" objects can be animated to create the illusion that the avatar is looking in a particular direction or tracking objects, as described in reference to FIGS. 6A-6B.

In some implementations, when adding both hair and hat elements to an avatar, the hair element can be modified so that when the hat element is added to the avatar the hair appears to be covered while still maintaining the selected hair style. For example, "spikey" hair with a baseball cap could result in hair sticking out through the top of the cap. To avoid this issue, the hair element is cut into two parts. The editing environment can determine if a hat and hair combination would result in hair sticking out through the top of the hat, and in those cases, only the bottom half of the hair is rendered on the avatar model.

Exemplary Avatar Element Picker

Figure 2A:
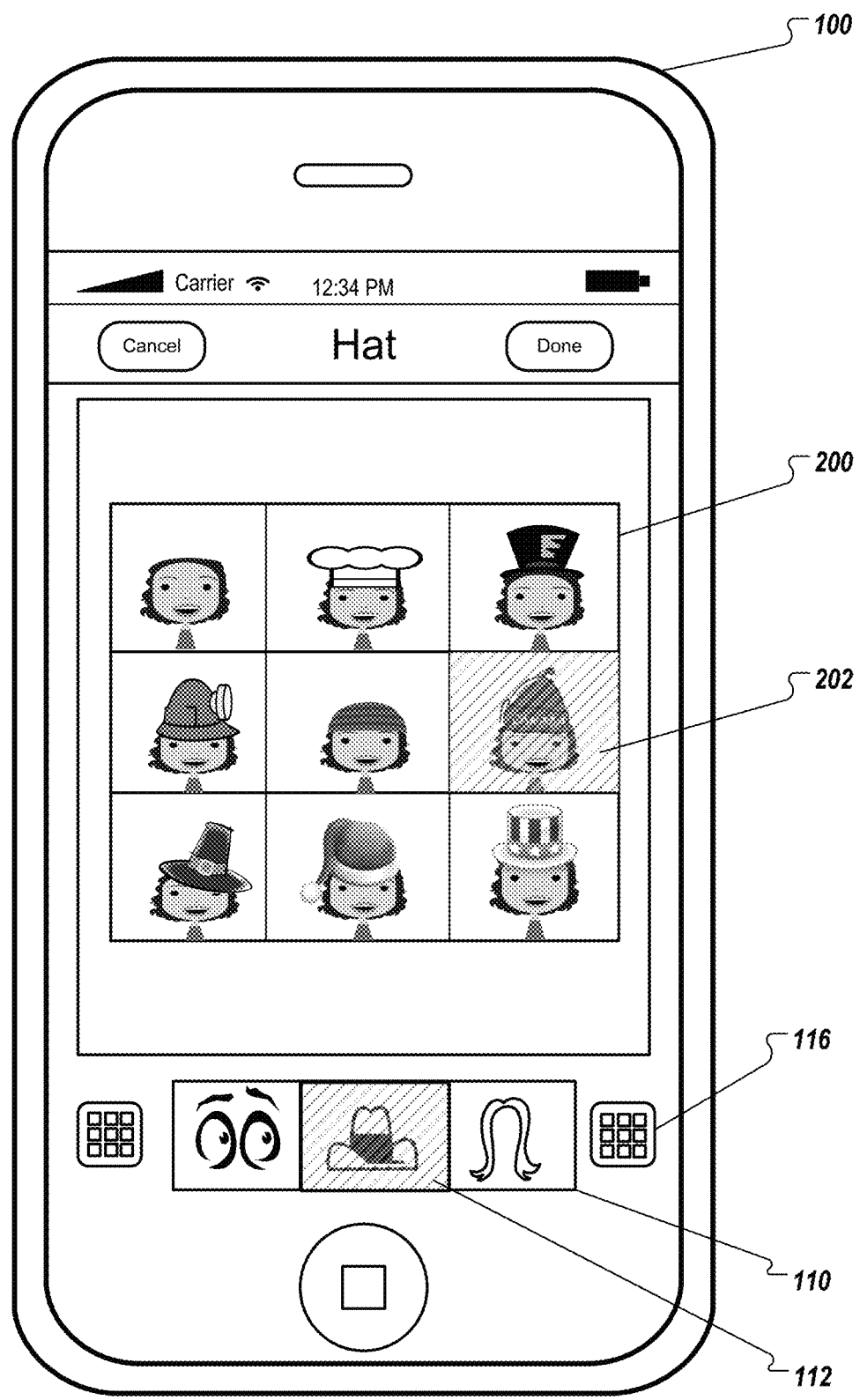
FIG. 2A illustrates an exemplary element picker for selecting avatar elements from a category of avatar elements.

FIG. 2A illustrates an exemplary element picker for selecting avatar elements from a category of avatar elements. In the example shown, the user has touched or otherwise interacted with element picker icon 116. Upon invocation of the element picker a grid view 200 is displayed. Grid view 200 can include a number of cells, where each cell displays an avatar in context with a different element selected from the category of elements. In this example, the "Hat" category was selected, resulting in each avatar displayed in a cell wearing a different hat.

In some implementations, one cell (e.g., top left corner cell in FIG. 2A) can display avatar 106 without the element (e.g., without a hat) for comparison with other cells. Another cell (e.g., center cell) can display avatar 106 with the currently selected element (e.g., the currently selected hat). In some implementations, each cell can contain a snapshot image of a 3D avatar model to capture appropriate lighting and shadows to provide a 3D effect. In other implementations, each cell can contain a 2D image of the avatar (e.g., front facing view). The user can select an element by touching or otherwise interacting with the cell displaying the desired element. In this example, the user has touched the third cell in the middle row grid view 200, where the avatar is shown wearing a "Canada" ski hat. The selected cell can be visually enhanced (e.g., highlighted, colored) to indicate its selected status. Touching the "Done" button can return the user to user interface 104 of the avatar editing environment.

The elements can be displayed in grid view 200 in a variety of ways. Avatars can be displayed in cells based on element type. For example, holiday hats can be displayed in the same row or column of grid view 200. In FIG. 2A, holiday hats for Thanksgiving, Christmas and Independence Day are displayed in the third row of grid view 200. Grid view 200 can be paginated so that a swipe gesture or other gesture can be used to display a new page with a new grid view. In some implementations, grid view 200 can be updated with new elements in response to a motion gesture. For example, when the user shakes device 100 or other motion gesture, a new grid view can be displayed with different elements from the currently selected category. An accelerometer or other motion sensor onboard device 100 can be used to detect motion. The new elements displayed in cells of the new grid view can be randomly selected based on other elements of avatar 106. For example, eye color, hair color and skin color can be used to select fashion elements having an appropriate color or color scheme, so that the resulting avatar 106 is color coordinated. The selection of colors can be based on known color heuristics.

Exemplary Avatar Color Picker

Figure 2B:
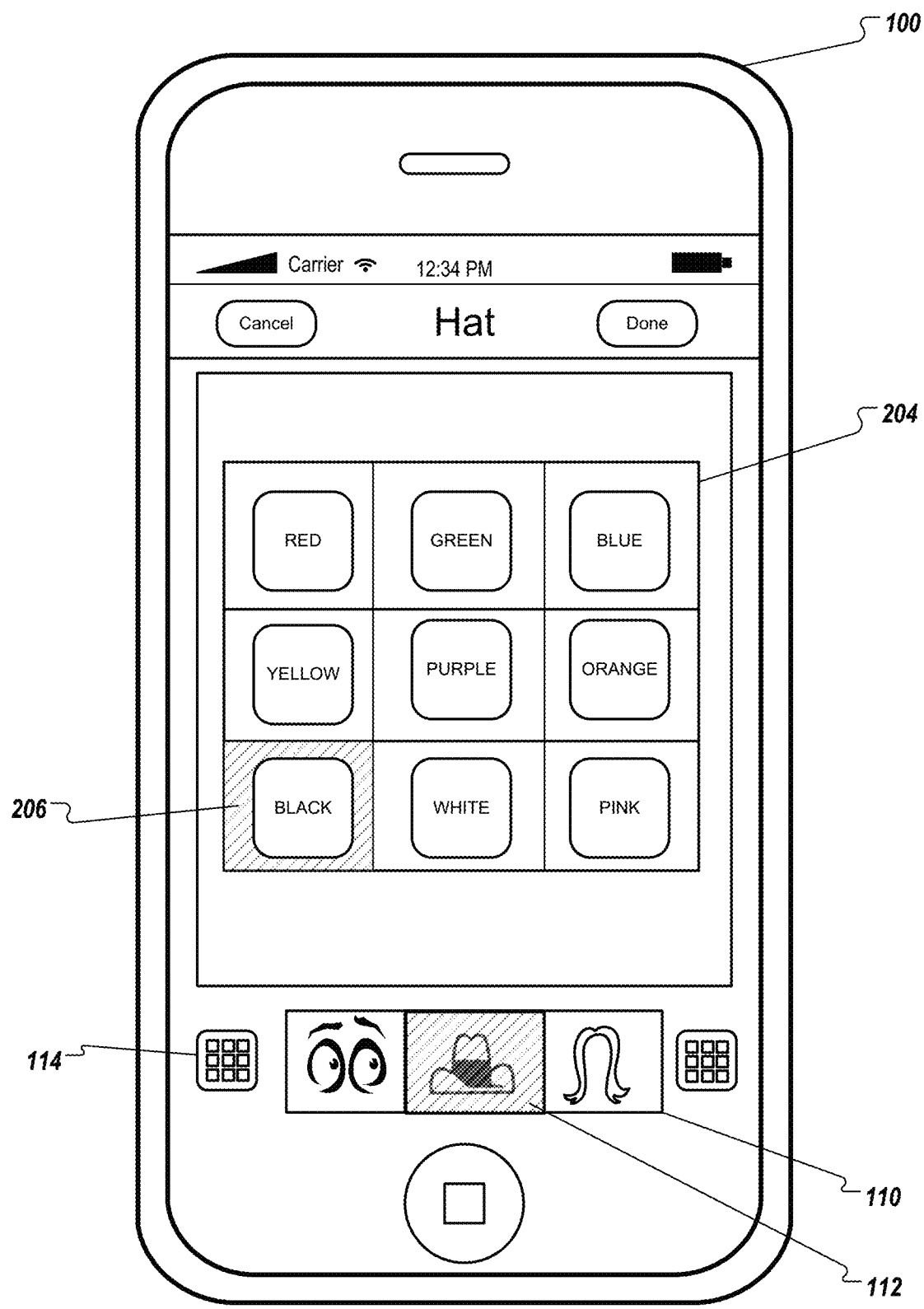
FIG. 2B illustrates an exemplary color picker for selecting a color for a category of avatar elements.

FIG. 2B illustrates an exemplary color picker for selecting a color for a category of avatar elements. In the example shown, the user has touched or otherwise interacted with color picker icon 114. Upon invocation of the color picker, a grid view 204 is displayed. Grid view 204 can include a number of cells, where each cell displays a different color. In this example, the color black was selected, resulting in each avatar displayed in cells of grid view 200 wearing a different black hat. The color selected in the color picker can be applied to all elements in the category selected by the category picker. In some implementations, the colors selected for display in grid view 204 can be limited based on the category selected. For example, if the "Nose" category is selected, then grid view 204 may display different skin tones. If the "Eyes" category is selected, then grid view 204 may display various shades of blue, green, brown and hazel, etc.

Exemplary Manual Editing of Avatar Elements

Figure 3A:
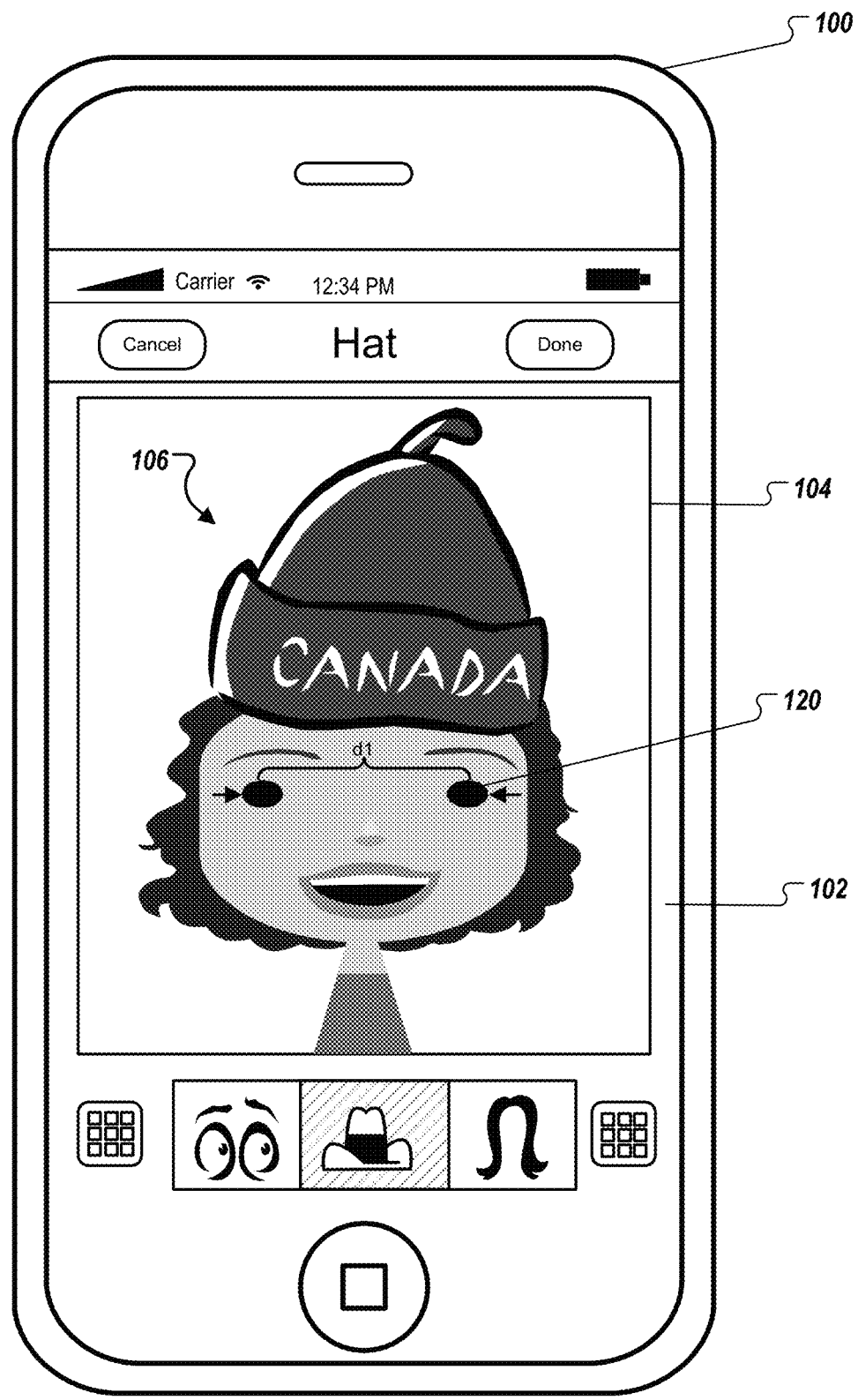
FIGS. 3A-3C illustrates exemplary processes for manually editing avatar elements.
Figure 3B:
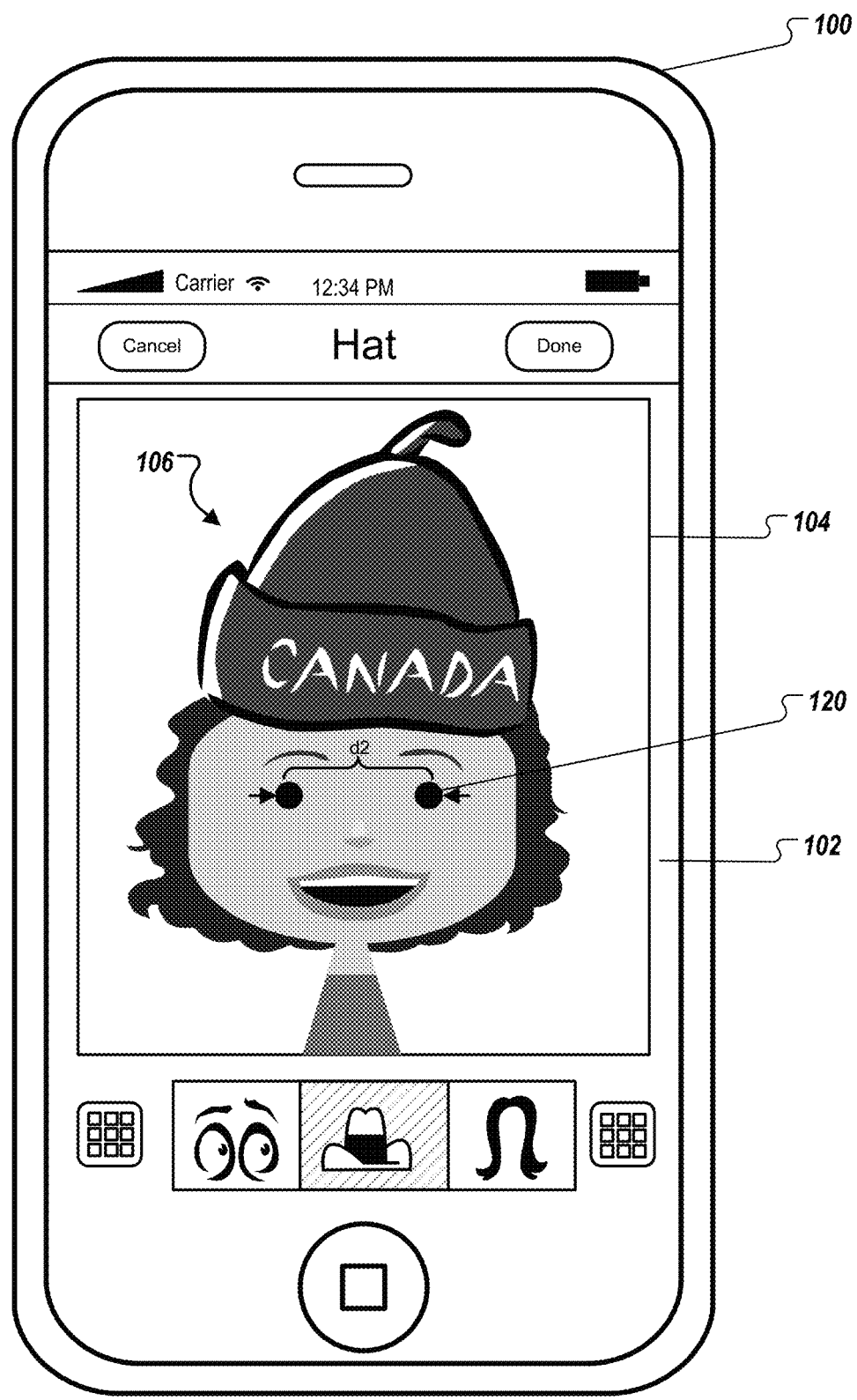
Figure 3C:
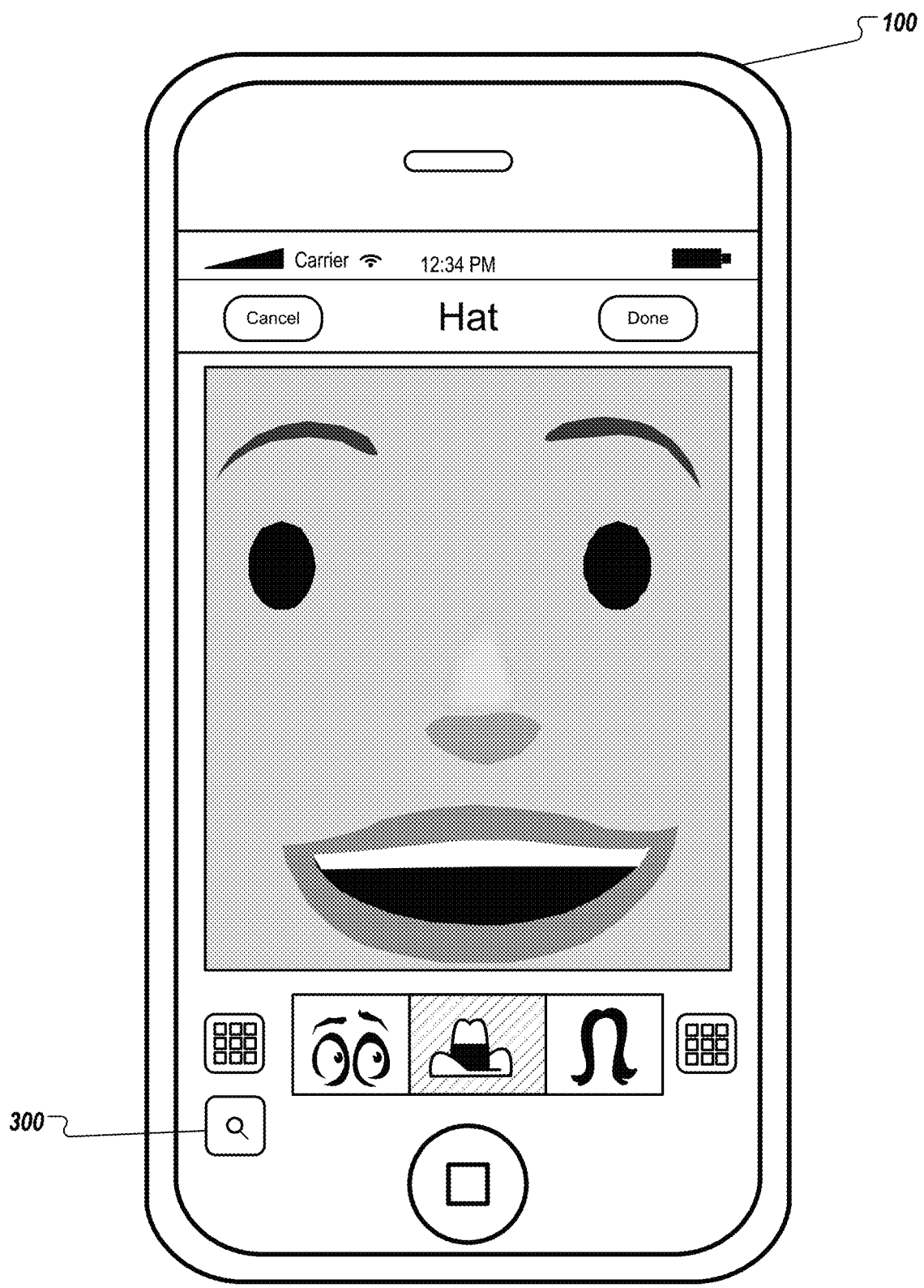

FIGS. 3A-3C illustrate exemplary processes for manually editing avatar elements. After the user has created a custom avatar by selecting and adding elements, the user can manually edit those elements in user interface 104.

In some implementations, the user can apply touch input and gestures to resize, rotate and position the elements of avatar 106. In the example shown, the user resized eyes element 120 by touching eyes element 120 at points indicated by arrows and making a pinching gesture in the direction of the arrows. FIG. 3B shows the result of the pinching gesture. In this example, eyes element 120 had a distance of d1 between the eyes before pinching (FIG. 3A) and a distance of d2 between the eyes after pinching (FIG. 3B), where d1>d2. For elements that have symmetry (e.g., eyes, ears), the symmetry can be maintained without user intervention during manual editing to assist the user in editing. In devices without a touch sensitive display, mouse controls can be used to resize, rotate and position elements on avatar 106.

Referring to FIG. 3C, the user can zoom on any of the elements of avatar 106 in user interface 104 for more refined manual editing. In some implementations, the element is automatically zoomed in response to a user touching the element. Multiple taps can change the zoom level increments where one zoom or magnification level change occurs for each tap. Alternatively, a reverse pinching gesture (spreading apart two fingers) can be used zoom elements of avatar 106. In other implementations, the user can zoom on a particular element using zoom button 300. Other zoom controls can also be used including, for example, a magnifying glass tool.

Exemplary Alternative Avatar Element Picker

Figure 4A:
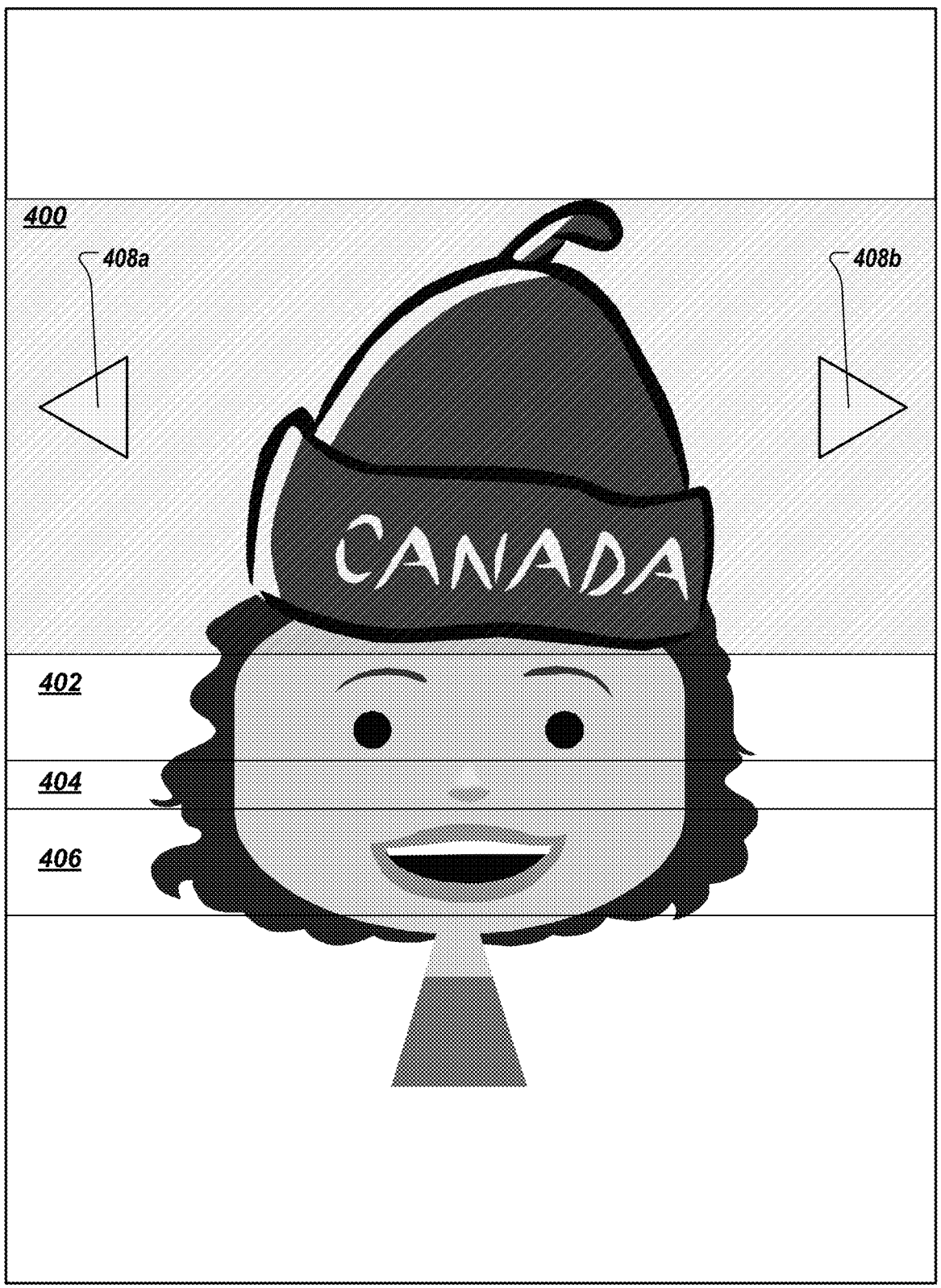
FIGS. 4A and 4B illustrate an alternative element picker for selecting avatar elements from a category of avatar elements.
Figure 4B:
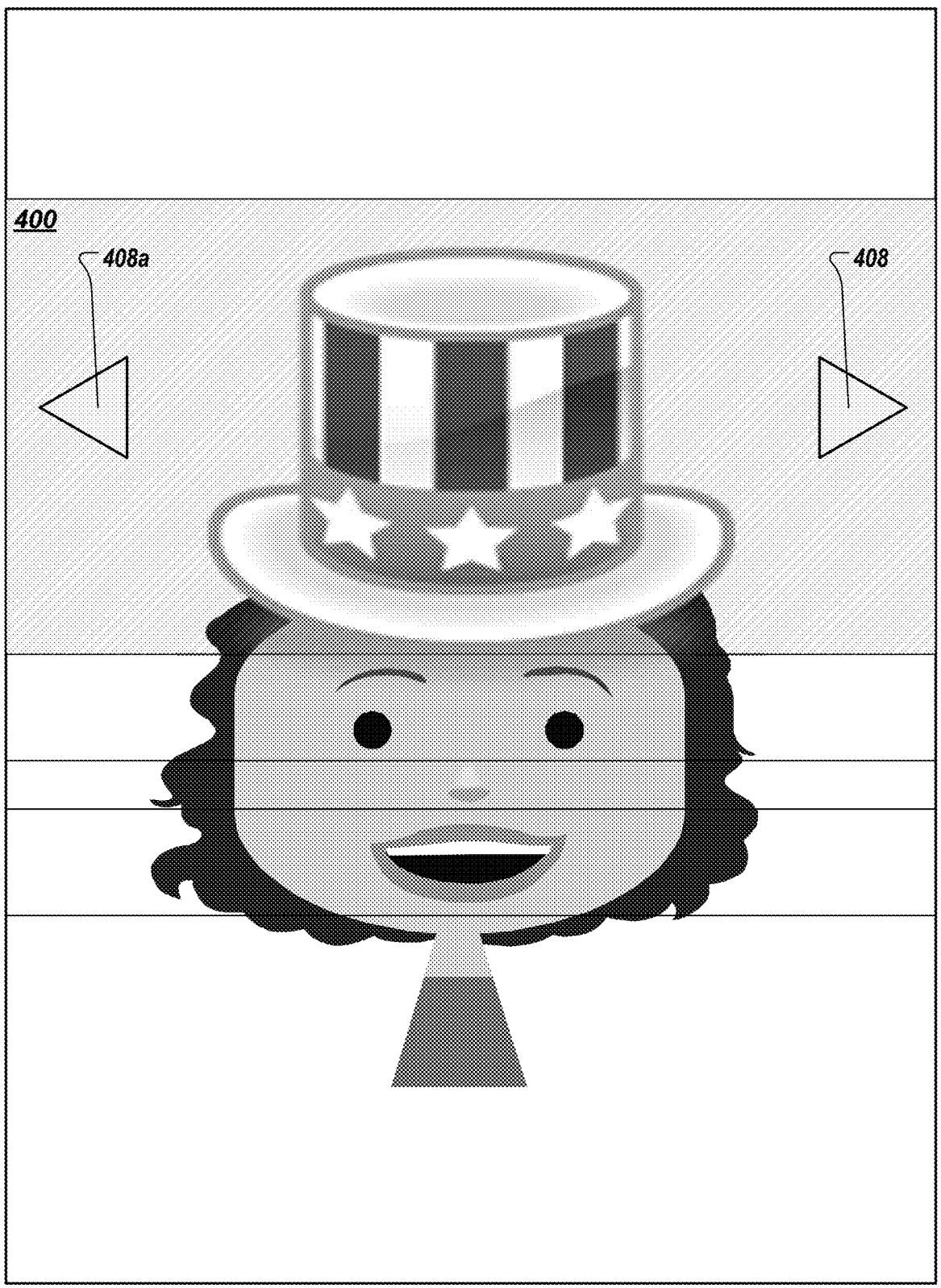

FIGS. 4A and 4B illustrate an alternative element picker for selecting avatar elements from a category of avatar elements. In some implementations, an avatar is divided into editing zones 400-406. In the example shown, zone 400 includes the hat, zone 402 includes the eyes, zone 404 includes the nose, zone 406 includes the mouth. Other zones are also possible. When a user wants to edit a particular element of the avatar, the user selects the corresponding zone containing the element. On a device with a touch sensitive display, the user can touch any portion of the zone to activate the zone. In the example shown, the user activated zone 400 containing the hat. Upon activation, buttons 408a, 408b can be displayed for selecting different hats. When a left or right button 408 is touched, a new hat slides in from the left or right of the display, respectively. Implementations using other animations or no animations are also possible. FIG. 4B shows the avatar with a new hat after activation of button 408.

Exemplary Manual Editing with Editing Regions

Figure 5C:
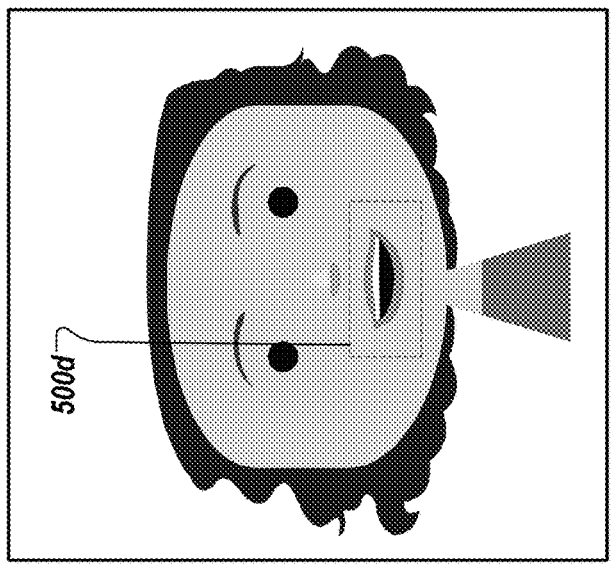
FIGS. 5A-5C illustrate editing regions for manually editing avatar elements.
Figure 5B:
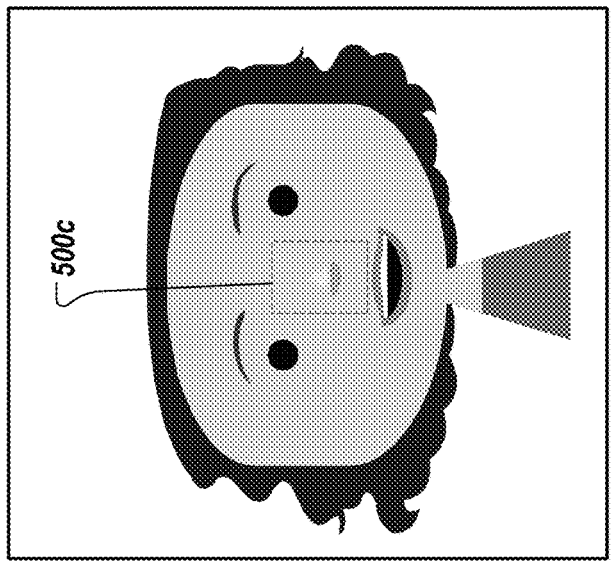
Figure 5A:
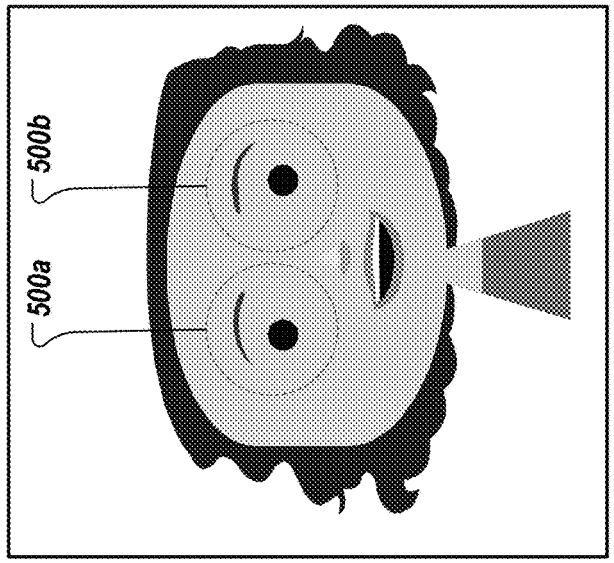

FIGS. 5A-5C illustrate editing regions for editing avatar elements in the avatar editing environment. In some implementation, manual edits made by a user to an element can restricted to defined editing regions. Using touch input or gestures, for example, the user can resize, stretch or move elements within the editing region. In some implementations, if the user resizes, stretches or moves an element out of the editing region, the element will "snap back" to the editing region. Alternatively, the element can bounce off a virtual wall or bumper defining the boundary of the editing region when the user attempts to resize, stretch or move the element outside the editing region. Restricting manual edits to defined editing regions can help a user in creating custom avatars.

Referring to FIGS. 5A-5C, editing regions 500a, 500b contain the left and right eyes of the avatar. The user can move, rotate or resize the eyes anywhere within their respective editing regions 500a, 500b. In this example, the editing regions 500a, 500b are circular regions. Editing regions 500a, 500b, however, can be any closed polygon, including but not limited to circles, squares, rectangles and triangles. FIG. 5B illustrates a rectangular editing region 500c for the nose of the avatar. The user can move, rotate, or resize the nose anywhere within the editing region 500c. FIG. 5C illustrates a rectangular editing region 500d for the mouth of the avatar. The user can move, rotate or resize the mouth anywhere within the editing region 500d.

Exemplary Avatar Animation

Figure 6B:
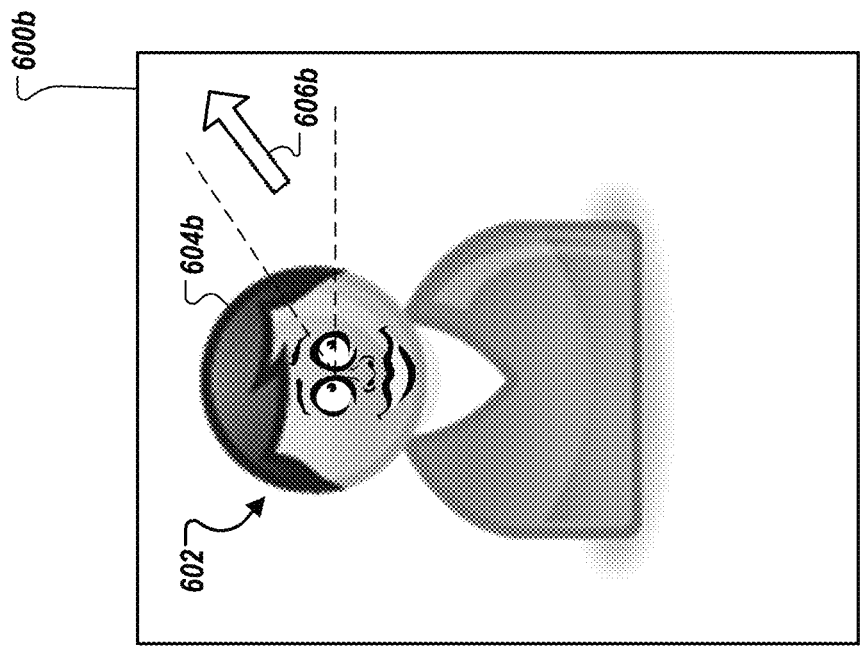
FIGS. 6A-6B illustrate animating avatar elements to track objects in a user interface or indicate direction.
Figure 6A:
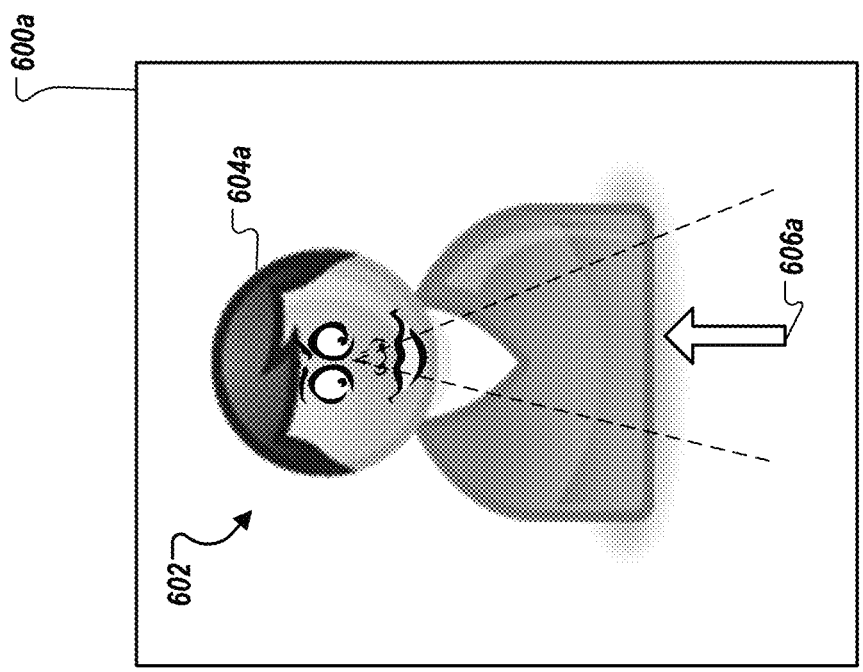

FIGS. 6A-6B illustrate animating avatar elements to track objects in a user interface. In some implementations, elements added to an avatar can be animated. For example, elements (e.g., eyes, mouths, ears, eyebrows) can be animated to simulate human facial expressions, such as happy, sad, angry, surprise, boredom contemplation or any other human facial expression. Animations can also be applied to avatar body parts (e.g., legs, arms, head) to allow the avatar to express itself through fully body movements (e.g., a dancing avatar).

In some implementations, animations for elements can be selected and previewed in the avatar editing environment. In some implementations, the user can select (e.g., select from a menu) a particular animation for a particular element. In other implementations, the use can set the animations to trigger in response to various trigger events. Some examples of trigger events can be user actions or context. In an email or text messaging application, if the user is waiting for a response from another user, their avatar can be animated to appear to be waiting or sleeping. For example, the avatar's eyes can be closed and the chest animated to contract and expand to simulate slow, deep breathing associated with sleeping. With a full body avatar, the avatar can be animated to tap its foot (perhaps with its arms crossed as well) simulate waiting or impatience.

Referring to FIGS. 6A and 6B, the eyes of avatar 602 can be animated to track a cursor 606 in a user interface 600. In user interface 600a, avatar 602 is looking down at cursor 606a. In interface 600b, avatar 602 is looking up and to the right at cursor 606b. The eyes of avatar 602 can be animated independently of each other and other elements, such as eyebrows. In some implementations, an avatar animation engine (e.g., 712) can register with an operation system (e.g., OS 708) to receive trigger events or position information, such as cursor coordinates. In some implementations, a line-of-sight vector from the eyes to the cursor can be computed in display coordinates using vector algebra. The line of sight vector can then be used by animation engine 712 to animate the eyes of avatar 602 to create the illusion that avatar 602 is tracking cursor 606 with its eyes as cursor 606 moves about user interface 600.

Avatar animations can be used in variety of applications, including but not limited to address books, chat sessions, video conferencing, email, games or any other application that can support an animated avatar. In an address book application, when a user receives an avatar with a video card (Vcard) from another individual, the avatar can "come alive" and follow the movement of a cursor with its eyes, head and/or body when the Vcard is opened. In a video chat environment, each party can be represented by an avatar rather than a digital image. Each party can use the avatar to track the other party's movement by controlling their respective avatar's eyes, head and body to follow the other party's avatar in a video chat room. In some implementations, an avatar viewing angle can mimic camera position.

Exemplary Software Architecture

Figure 7A:
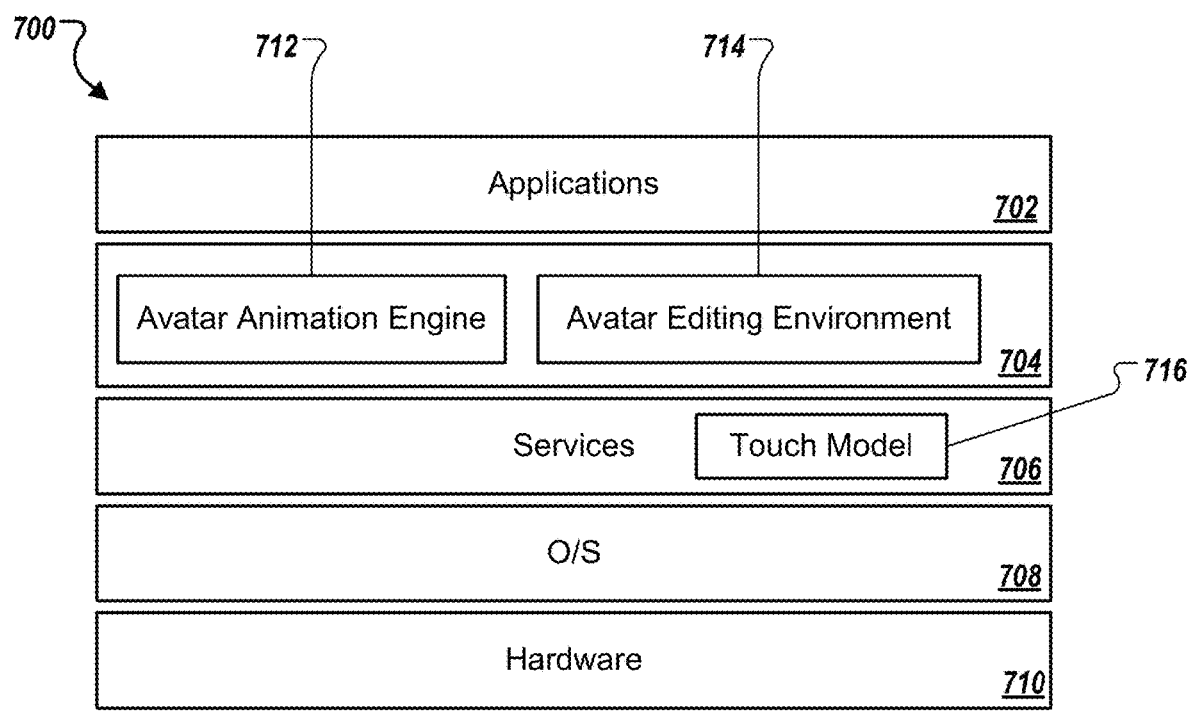
FIGS. 7A-7C is an exemplary software architecture for implementing the avatar editing environment and animation described in reference to FIGS. 1-6.

FIG. 7A is an exemplary software architecture for implementing the avatar editing environment and animation described in reference to FIGS. 1-6. In some implementations, the avatar editing environment can be part of a framework in a software architecture or stack. An exemplary software stack 700 can include an applications layer 702, framework layer 704, services layer 706, OS layer 708 and hardware layer 710. Applications (e.g., email, text messaging, games) can incorporate the avatar editing environment through the use of an Application Programming Interfaces (API). Framework layer 704 can include avatar animation engine 712 and avatar editing environment 714. Avatar animation engine 712 can handle animation of avatar elements, such as the animations described in reference to FIGS. 6A and 6B. Animation engine 712 can make API calls to graphics and animations services or libraries in services layer 706 or OS layer 708 to perform all or some of its tasks. Avatar editing environment 714 can provide the user interfaces and features described in reference to FIGS. 1-5. Avatar editing environment 714 can make API calls to services or libraries in services layer 706 or OS layer 708 to perform all or some of its tasks.

Services layer 706 can provide various graphics, animations and UI services to support animation engine 712, avatar editing environment 714 and applications in applications layer 702. In some implementations, services layer 706 includes touch model 716 for interpreting and mapping raw touch data from a touch sensitive device to touch events (e.g., gestures, rotations), which can be accessed by applications and by avatar editing environment 714 using call conventions defined in a touch model API. Services layer 706 can also include communications software stacks for wireless communications.

OS layer 708 can be a complete operating system (e.g., MAC OS) or a kernel (e.g., UNIX kernel). Hardware layer 710 includes hardware necessary to perform the tasks described in reference to FIGS. 1-6, including but not limited to: processors or processing cores (including application and communication baseband processors), dedicated signal/image processors, ASICs, graphics processors (e.g., GNUs), memory and storage devices, communication ports and devices, peripherals, etc.

Software stack 700 can be included on a mobile device capable of executing software applications. An API specification describing call conventions for accessing API functions can be used by application developers to incorporate avatar editing and animation in applications.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments, the application or client program may incorporate calls to functions or methods provided by the SDK and provided by the API, or use data types or objects defined in the SDK and provided by the API. An Application Framework may, in these embodiments, provides a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodment, call APIs from different providers such as a set of APIs from an OS provider and another set of APIs from a plug-in provider and another set of APIs from another provider (e.g. the provider of a software library) or creator of the another set of APIs.

Figure 7B:
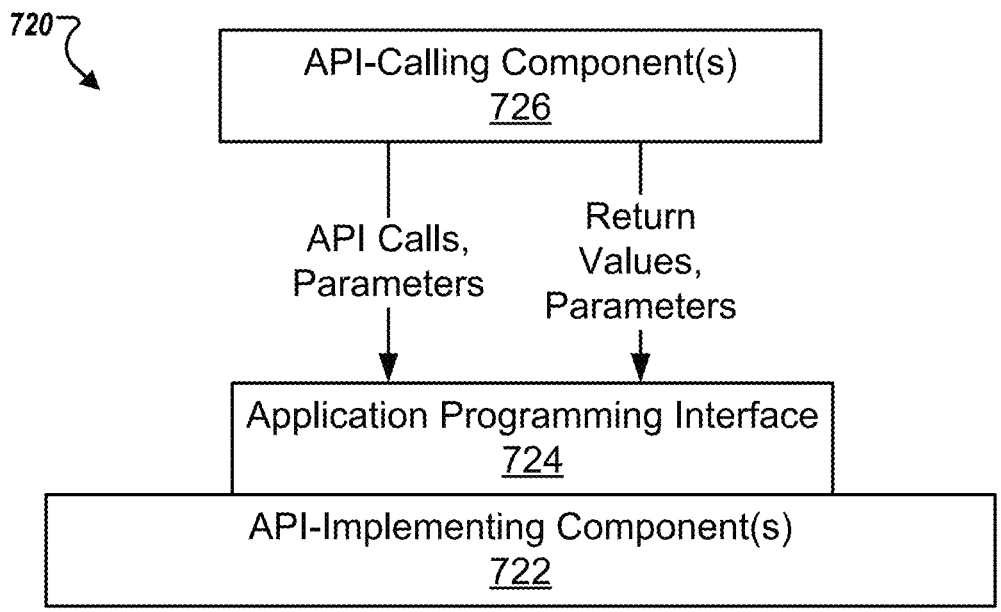

FIG. 7B is a block diagram illustrating an exemplary API architecture, which may be used in some embodiments of the invention. As shown in FIG. 7B, the API architecture 720 includes the API-implementing component 722 (e.g., an operating system, a library, a device driver, an API, an application program, software or other module) that implements the API 724. The API 724 specifies one or more functions, methods, classes, objects, protocols, data structures, formats and/or other features of the API-implementing component that may be used by the API-calling component 726. The API 724 can specify at least one calling convention that specifies how a function in the API-implementing component receives parameters from the API-calling component and how the function returns a result to the API-calling component. The API-calling component 726 (e.g., an operating system, a library, a device driver, an API, an application program, software or other module), makes API calls through the API 724 to access and use the features of the API-implementing component 722 that are specified by the API 724. The API-implementing component 722 may return a value through the API 724 to the API-calling component 726 in response to an API call.

It will be appreciated that the API-implementing component 722 may include additional functions, methods, classes, data structures, and/or other features that are not specified through the API 724 and are not available to the API-calling component 726. It should be understood that the API-calling component 726 may be on the same system as the API-implementing component 722 or may be located remotely and accesses the API-implementing component 722 using the API 724 over a network. While FIG. 7B illustrates a single API-calling component 726 interacting with the API 724, it should be understood that other API-calling components, which may be written in different languages (or the same language) than the API-calling component 726, may use the API 724.

The API-implementing component 722, the API 724, and the API-calling component 726 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 7C:
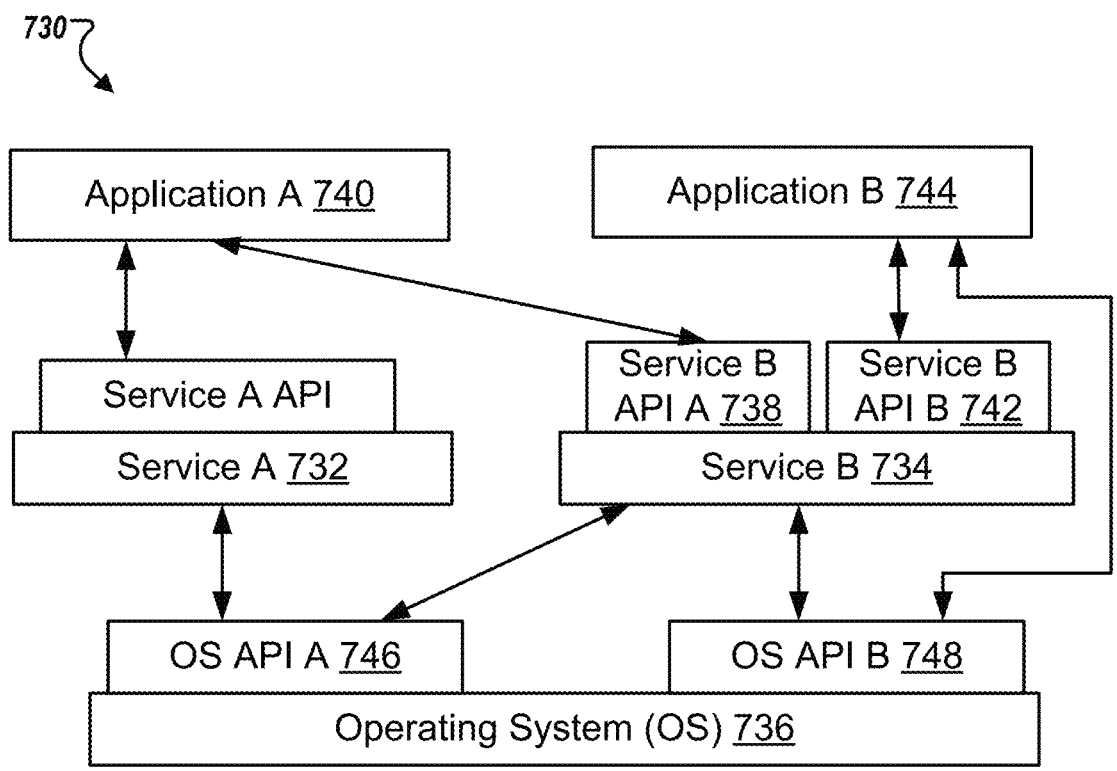

In FIG. 7C ("Software Stack" 730), an exemplary embodiment, applications can make calls to Service A 732 or Service B 734 using several Service APIs (Service API A and Service API B) and to Operating System (OS) 736 using several OS APIs. Service A 732 and service B 734 can make calls to OS 736 using several OS APIs.

Note that the Service B 734 has two APIs, one of which (Service B API A 738) receives calls from and returns values to Application A 740 and the other (Service B API B 742) receives calls from and returns values to Application B 744. Service A 732 (which can be, for example, a software library) makes calls to and receives returned values from OS API A 746, and Service B 734 (which can be, for example, a software library) makes calls to and receives returned values from both OS API A 746 and OS API B 748. Application B 744 makes calls to and receives returned values from OS API B 748.

Exemplary Avatar Editing Process

Figure 8:
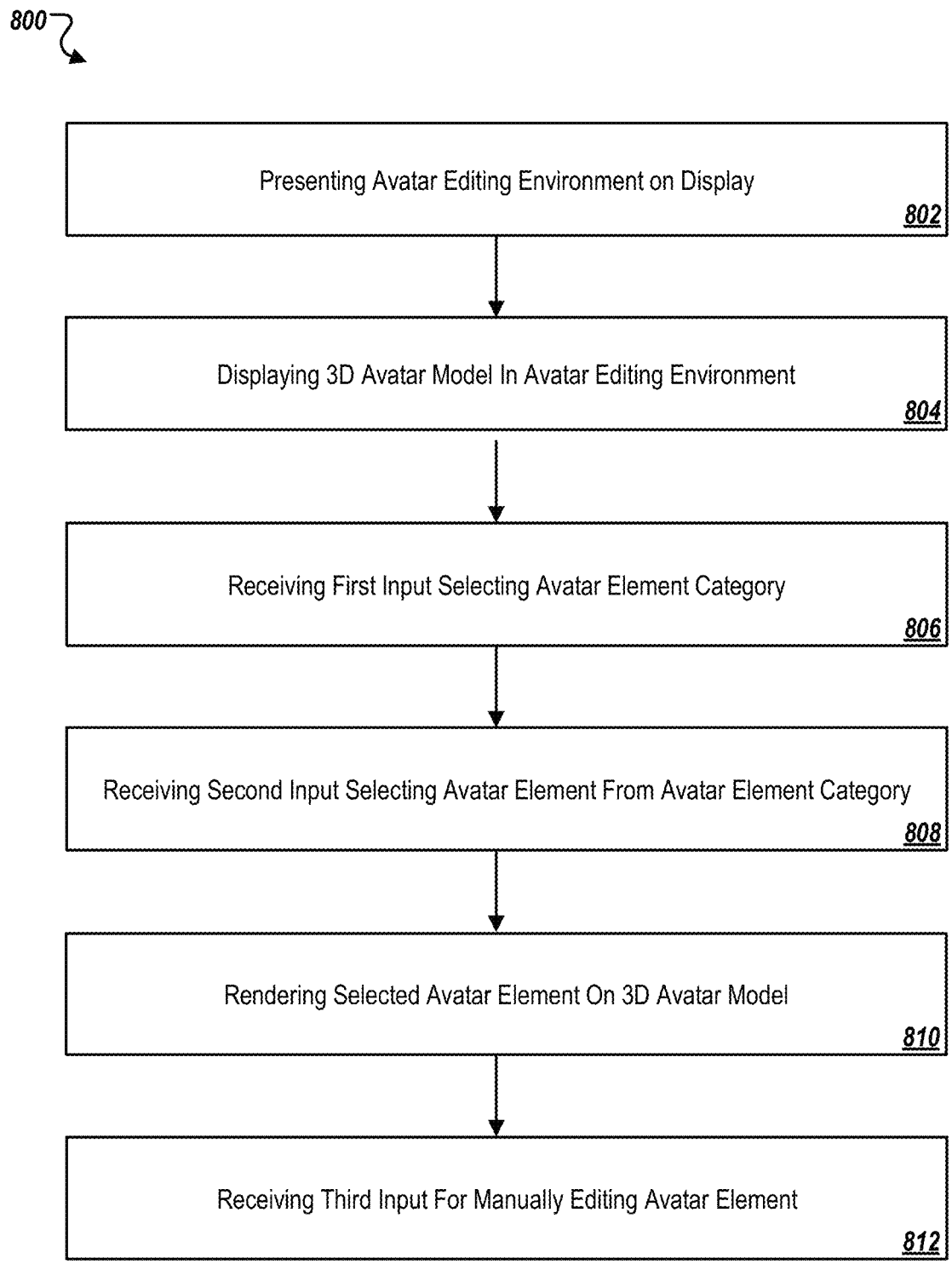
FIG. 8 is a flow diagram of an exemplary process for creating an avatar in an avatar editing environment.

FIG. 8 is a flow diagram of an exemplary process 800 for creating an avatar in an avatar editing environment. Process 800 can be described in reference to a system for implementing the process, such as the avatar editing environment described in reference to FIGS. 1-7.

In some implementations, process 800 can begin by presenting an avatar editing environment on a display of a device (802) and displaying an avatar model in the environment (804). The avatar model can be a 2D or 3D model. The display can be a touch sensitive display. The avatar model can be displayed with a blank face or a default avatar with predefined elements can be displayed based on information previously gathered from the user.

First input is received selecting an avatar element category (806). In some implementations, a category picker can be used such as the category picker described in reference to FIGS. 1A-1E.

Second input is received selecting an element from the selected element category (808). In some implementations, an element picker can be used such as the element picker described in reference to FIGS. 1A-1E and FIGS. 4A and 4B.

After an element is selected, the element can be automatically rendered on-the-fly on the avatar model (810). In some implementations, elements can be 2D textures that are rendered on a 3D avatar model.

A third input is received for manually editing an element of the avatar (812). The third input can be a touch input or gesture focused on the element to be edited. Manual editing can include resizing, rotating and positioning the element. Manual editing can be restricted to editing regions. Manual editing can include zooming or magnifying an element for more refined editing.

Exemplary Mobile Device Architecture

Figure 9:
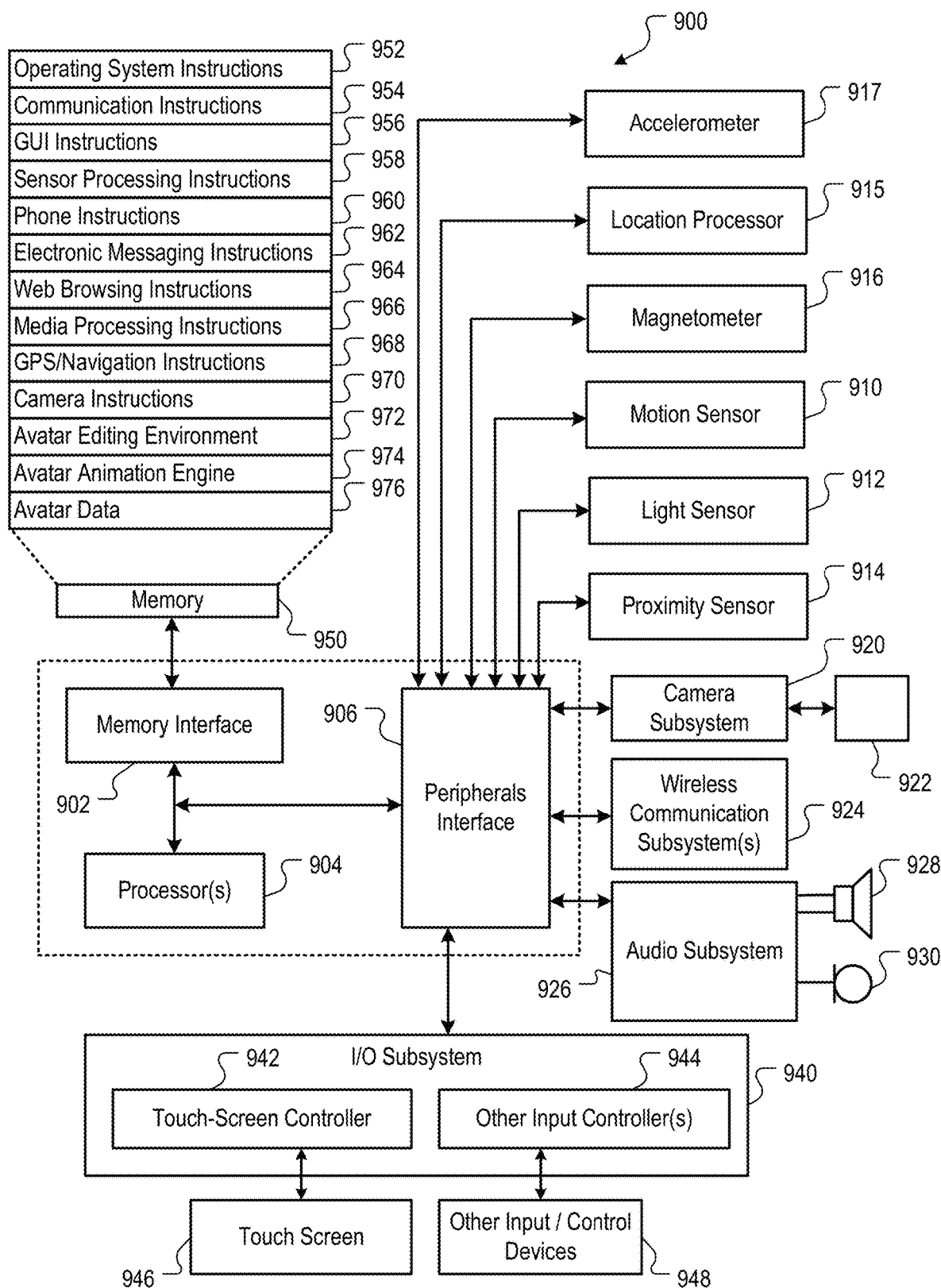
FIG. 9 is a block diagram of an exemplary hardware architecture for implementing the avatar editing environment and animation described in reference to FIGS. 1-8.

FIG. 9 is a block diagram of an exemplary hardware architecture for a device implementing the avatar editing environment and animation described in reference to FIGS. 1-8. The device can include memory interface 902, one or more data processors, image processors and/or processors 904, and peripherals interface 906. Memory interface 902, one or more processors 904 and/or peripherals interface 906 can be separate components or can be integrated in one or more integrated circuits. The various components in the device, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to the device on or off. The user may be able to customize a functionality of one or more of the buttons. The touch screen 946 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; and camera instructions 970 to facilitate camera-related processes and functions. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950.

Memory 950 can include instructions for avatar editing environment 972 and avatar animation engine 974. Memory 950 can be a local cache for avatar data 976 that results from the avatar editing process.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
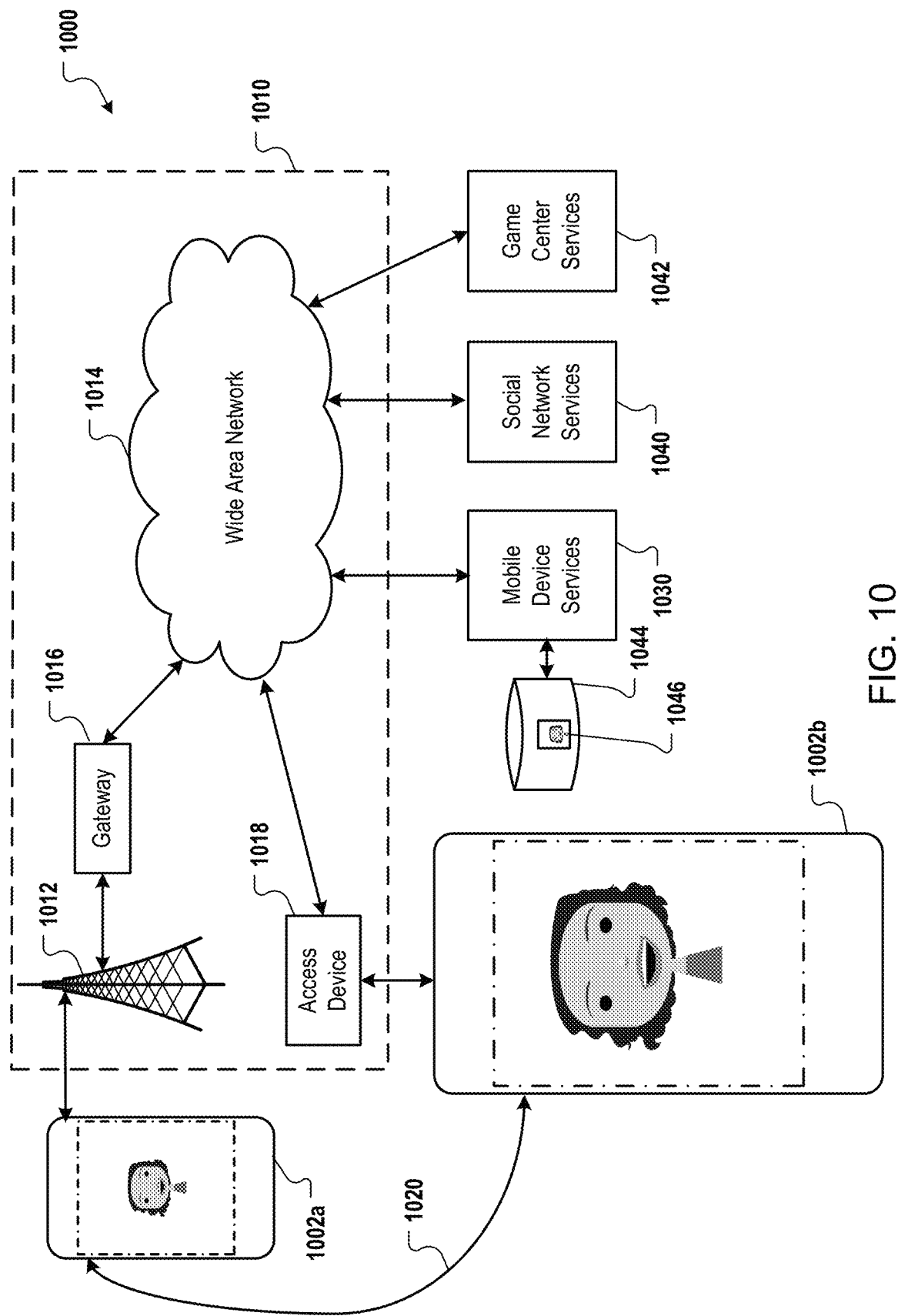
FIG. 10 is a block diagram of an exemplary network operating environment for a device employing the avatar editing environment and animation described in reference to FIGS. 1-9.

FIG. 10 is a block diagram of an exemplary network operating environment for a device employing the avatar editing environment and animation described in reference to FIGS. 1-8. In this example, devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access device, can provide communication access to the wide area network 1014. Although this example illustrates an operating environment for mobile devices, the operating environment can also be applied to a device that is wired to a network (e.g., a desktop computer).

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, device 1002a or 1002b can be physically connected to the access device 1018 using one or more cables and the access device 1018 can be a personal computer. In this configuration, device 1002a or 1002b can be referred to as a "tethered" device.

Devices 1002a and 1002b can also establish communications by other means. For example, wireless device 1002a can communicate with other wireless devices, e.g., other devices 1002a or 1002b, cell phones, etc., over the wireless network 1012. Likewise, devices 1002a and 1002b can establish peer-to-peer communications 1020, e.g., a personal area network, by use of one or more communication subsystems, such as the Bluetooth™ communication devices. Other communication protocols and topologies can also be implemented.

Device 1002a or 1002b can communicate with a variety of services over the one or more wired and/or wireless networks. In some implementations, services can include mobile device services 1030, social network services 1040, and game center services 1042.

Mobile device services 1030 can provide a variety of services for device 1002a or 1002b, including but not limited to mail services, text messaging, chat sessions, videoconferencing, Internet services, location based services (e.g., map services), sync services, remote storage 1044, downloading services, etc. Remote storage 1046 can be used to store avatar data, which can be used on multiple devices of the user or shared by multiple users. In some implementations, an avatar editing environment can be provided by one or more of the services 1030, 1040, 1042, which can be accessed by a user of device 1002a or 1002b through, for example, web pages served by one or more servers operated by the services 1030, 1040, 1042.

In some implementations, social networking services 1040 can provide a social networking website, where a user of device 1002a or 1002b can set up a personal network and invite friends to contribute and share content, including avatars and avatar related items. A user can use their custom avatar made with an avatar editing environment in place of a digital photo to protect their privacy.

In some implementations, game center services 1042 can provide an online gaming environment, where users of device 1002a or 1002b can participate in online interactive games with their avatars created using the avatar editing environment described in reference to FIGS. 1-7. In some implementations, avatars and/or elements created by an avatar editing environment can be shared among users or sold to players of online games. For example, an avatar store can be provided by game center services 1042 for users to buy or exchange avatars and avatar related items (e.g., clothes, accessories).

Device 1002a or 1002b can also access other data and content over the one or more wired and/or wireless networks. For example, content publishers, such as news sites, Rally Simple Syndication (RSS) feeds, web sites, blogs, social networking sites, developer networks, etc., can be accessed by device 1002a or 1002b. Such access can be provided by invocation of a web browsing function or application (e.g., a browser) in response to a user touching, for example, a Web object.

Figure 11:
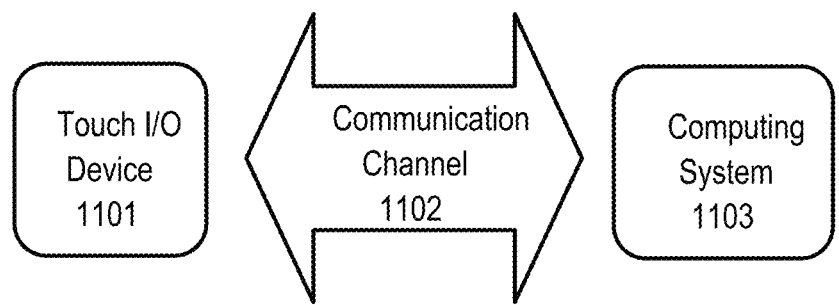
FIG. 11 is block diagrams illustrating communication between an exemplary Touch I/O device and a computing system.

Described embodiments may include touch I/O device 1101 that can receive touch input for interacting with computing system 1103 (FIG. 11) via wired or wireless communication channel 1102. Touch I/O device 1101 may be used to provide user input to computing system 1103 in lieu of or in combination with other input devices such as a keyboard, mouse, etc. One or more touch I/O devices 1101 may be used for providing user input to computing system 1103. Touch I/O device 1101 may be an integral part of computing system 1103 (e.g., touch screen on a laptop) or may be separate from computing system 1103.

Touch I/O device 1101 may include a touch sensitive panel which is wholly or partially transparent, semitransparent, non-transparent, opaque or any combination thereof. Touch I/O device 1101 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1101 embodied as a touch screen may include a transparent and/or semitransparent touch sensitive panel partially or wholly positioned over at least a portion of a display. According to this embodiment, touch I/O device 1101 functions to display graphical data transmitted from computing system 1103 (and/or another source) and also functions to receive user input. In other embodiments, touch I/O device 1101 may be embodied as an integrated touch screen where touch sensitive components/devices are integral with display components/devices. In still other embodiments, a touch screen may be used as a supplemental or additional display screen for displaying supplemental or the same graphical data as a primary display and to receive touch input.

Touch I/O device 1101 may be configured to detect the location of one or more touches or near touches on device 1101 based on capacitive, resistive, optical, acoustic, inductive, mechanical, chemical measurements, or any phenomena that can be measured with respect to the occurrences of the one or more touches or near touches in proximity to device 1101. Software, hardware, firmware or any combination thereof may be used to process the measurements of the detected touches to identify and track one or more gestures. A gesture may correspond to stationary or non-stationary, single or multiple, touches or near touches on touch I/O device 1101. A gesture may be performed by moving one or more fingers or other objects in a particular manner on touch I/O device 1101 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1103 may drive a display with graphical data to display a graphical user interface (GUI). The GUI may be configured to receive touch input via touch I/O device 1101. Embodied as a touch screen, touch I/O device 1101 may display the GUI. Alternatively, the GUI may be displayed on a display separate from touch I/O device 1101.

The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1101 which may be associated with the graphical elements of the GUI. In other embodiments, the user may perform gestures at one or more locations that are independent of the locations of graphical elements of the GUI. Gestures performed on touch I/O device 1101 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1103 (e.g., affect a state or mode of a GUI, application, or operating system). Gestures may or may not be performed on touch I/O device 1101 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1102 in response to or based on the touch or near touches on touch I/O device 1101. Feedback may be transmitted optically, mechanically, electrically, olfactory, acoustically, or the like or any combination thereof and in a variable or non-variable manner.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

Figure 12:
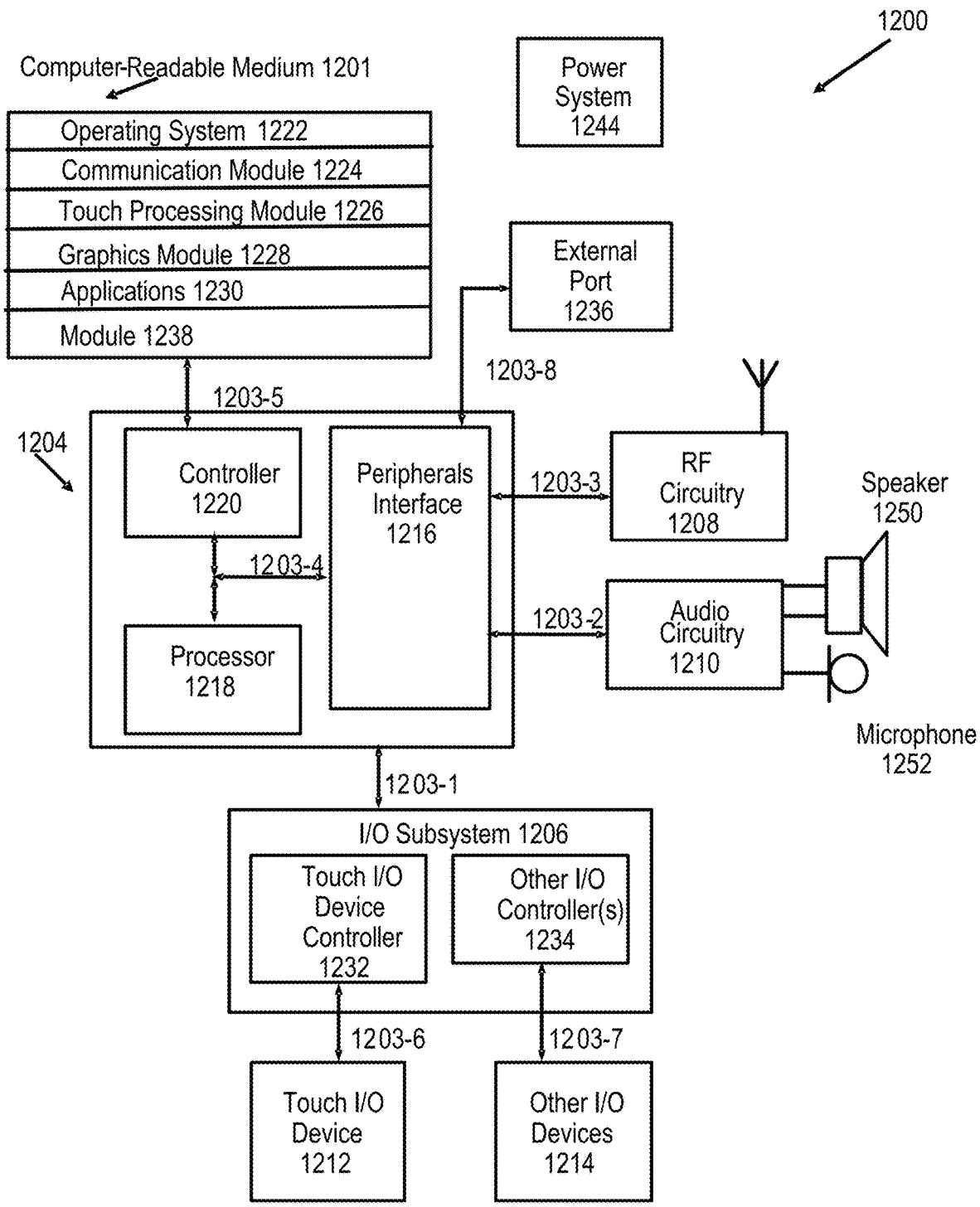
FIG. 12 is a block diagram of an exemplary architecture for a device having touch I/O capabilities.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 1200, including combinations of two or more of these types of devices. FIG. 12 is a block diagram of one embodiment of system 1200 that generally includes one or more computer-readable mediums 1201, processing system 1204, Input/Output (I/O) subsystem 1206, radio frequency (RF) circuitry 1208 and audio circuitry 1210. These components may be coupled by one or more communication buses or signal lines 1203.

It should be apparent that the architecture shown in FIG. 12 is only one example architecture of system 1200, and that system 1200 could have more or fewer components than shown, or a different configuration of components. The various components shown in FIG. 12 can be implemented in hardware, software, firmware or any combination thereof, including one or more signal processing and/or application specific integrated circuits.

RF circuitry 1208 is used to send and receive information over a wireless link or network to one or more other devices and includes well-known circuitry for performing this function. RF circuitry 1208 and audio circuitry 1210 are coupled to processing system 1204 via peripherals interface 1216. Interface 1216 includes various known components for establishing and maintaining communication between peripherals and processing system 1204. Audio circuitry 1210 is coupled to audio speaker 1250 and microphone 1252 and includes known circuitry for processing voice signals received from interface 1216 to enable a user to communicate in real-time with other users. In some embodiments, audio circuitry 1210 includes a headphone jack (not shown).

Peripherals interface 1216 couples the input and output peripherals of the system to processor 1218 and computer-readable medium 1201. One or more processors 1218 communicate with one or more computer-readable mediums 1201 via controller 1220. Computer-readable medium 1201 can be any device or medium that can store code and/or data for use by one or more processors 1218. Medium 1201 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1201 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 1218 run various software components stored in medium 1201 to perform various functions for system 1200. In some embodiments, the software components include operating system 1222, communication module (or set of instructions) 2024, touch processing module (or set of instructions) 1226, graphics module (or set of instructions) 1228, one or more applications (or set of instructions) 1230, and avatar editing module 1238. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 1201 may store a subset of the modules and data structures identified above. Furthermore, medium 1201 may store additional modules and data structures not described above.

Operating system 1222 includes various procedures, sets of instructions, software components and/or drivers for controlling and managing general system tasks (e.g., memory management, storage device control, power management, etc.) and facilitates communication between various hardware and software components.

Communication module 1224 facilitates communication with other devices over one or more external ports 1236 or via RF circuitry 1208 and includes various software components for handling data received from RF circuitry 1208 and/or external port 1236.

Graphics module 1228 includes various known software components for rendering, animating and displaying graphical objects on a display surface. In embodiments in which touch I/O device 1212 is a touch sensitive display (e.g., touch screen), graphics module 1228 includes components for rendering, displaying, and animating objects on the touch sensitive display.

One or more applications 1230 can include any applications installed on system 1200, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 1226 includes various software components for performing various tasks associated with touch I/O device 1212 including but not limited to receiving and processing touch input received from I/O device 1212 via touch I/O device controller 1232.

System 1200 may further include avatar editing module 1238 for performing the method/functions as described herein in connection with FIGS. 1-7. Avatar editing module 1238 may at least function to provide the avatar editing environment described with respect to FIGS. 1-7. Avatar editing module 1238 may also interact with other elements of system 1200 to provide the avatar editing functions. Avatar editing module 1238 may be embodied as hardware, software, firmware, or any combination thereof. Although module 1238 is shown to reside within medium 1201, all or portions of module 1238 may be embodied within other components within system 1200 or may be wholly embodied as a separate component within system 1200.

I/O subsystem 1206 is coupled to touch I/O device 1212 and one or more other I/O devices 1214 for controlling or performing various functions. Touch I/O device 1212 communicates with processing system 1204 via touch I/O device controller 1232, which includes various components for processing user touch input (e.g., scanning hardware). One or more other input controllers 1234 receives/sends electrical signals from/to other I/O devices 1214. Other I/O devices 1214 may include physical buttons, dials, slider switches, sticks, keyboards, touch pads, additional display screens, or any combination thereof.

If embodied as a touch screen, touch I/O device 1212 displays visual output to the user in a GUI. The visual output may include text, graphics, video, and any combination thereof. Some or all of the visual output may correspond to user-interface objects. Touch I/O device 1212 forms a touch-sensitive surface that accepts touch input from the user. Touch I/O device 1212 and touch screen controller 1232 (along with any associated modules and/or sets of instructions in medium 1201) detects and tracks touches or near touches (and any movement or release of the touch) on touch I/O device 1212 and converts the detected touch input into interaction with graphical objects, such as one or more user-interface objects. In the case in which device 1212 is embodied as a touch screen, the user can directly interact with graphical objects that are displayed on the touch screen. Alternatively, in the case in which device 1212 is embodied as a touch device other than a touch screen (e.g., a touch pad), the user may indirectly interact with graphical objects that are displayed on a separate display screen embodied as I/O device 1214.

Touch I/O device 1212 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 1202/0015024A1, each of which is hereby incorporated by reference.

Embodiments in which touch I/O device 1212 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 1212 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1200 also includes power system 1244 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 1216, one or more processors 1218, and memory controller 1220 may be implemented on a single chip, such as processing system 1204. In some other embodiments, they may be implemented on separate chips.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method performed by one or more processors, comprising:
    presenting, on a display of a device, an avatar editing environment, the avatar editing environment concurrently displaying, within the avatar editing, environment:
        an avatar model including a first element selected from a category of elements; and
        an element picker affordance;
    receiving a first input corresponding to selection of the element picker affordance; and
    in response to receiving the first input, displaying, within the avatar editing environment:
        a first representation of the avatar model with a second element from the category of elements, wherein the second element is different from the first element; and
        a second representation of the avatar model with a third element from the category of elements, wherein the third element is different from the first element and the second element.

2. The method of claim 1, where the device is a mobile device and the display is a touch sensitive display.

3. The method of claim 2, where the first input is a touch input or gesture received on the touch sensitive display.

4. The method of claim 2, further comprising:
    displaying a bar within the avatar editing environment, the bar containing a number of icons representing different categories of elements; and
    applying a touch input to the bar on the display to animate the icons, the animation simulating motion of the icons through a center position of the bar, where the icon occupying the center position of the bar when the motion stops represents the category of elements.

5. The method of claim 2, where displaying, within the avatar editing environment, the first representation of the avatar model and the second representation of the avatar model, comprises:
    displaying a grid view within the avatar editing environment, at least one cell in the grid view displaying the avatar model including the first element, the first representation of the avatar model, the second representation of the avatar model, and a third representation of the avatar model without an element from the category of elements;
    associating a second input with a cell; and
    selecting, based on the associating, one of the avatar models including the first element, the first representation of the avatar model, the second representation of the avatar model, and the third representation of the avatar model.

6. The method of claim 2, where displaying, within the avatar editing environment, comprises:
    displaying, within the avatar editing environment, a two-dimensional texture representing the second element from the category of elements and the third element from the category of elements.

7. The method of claim 2, further comprising:
    receiving a second input corresponding to selection of one of the first representation of the avatar model and the second representation of the avatar model;

in response to receiving the second input, displaying, in the avatar editing environment, the first representation of the avatar model or the second representation of the avatar model; and receiving, within the avatar editing environment, a third input corresponding to manual editing of the displayed first representation of the avatar model or the second representation of the avatar model.

8. The method of claim 7, where the manual editing of the first representation of the avatar model or the second representation of the avatar model comprises one of moving, rotating, and resizing the first representation of the avatar model or the second representation of the avatar model.

9. The method of claim 1, further comprising:
providing, by the device, avatar data to an application saved on the device, the avatar data operable for creating the avatar in the application.

10. The method of claim 9, further comprising:
animating, on the display of the device, the avatar in the application.

11. The method of claim 10, where animating, on the display of the device, the avatar in the application, comprises:
animating, on the display of the device, an eye element on the avatar in response to a trigger event received on the device.

12. The method of claim 11, where animating, on the display of the device, an eye element, comprises:
animating, on the display of the device, the eye element to follow a cursor or other object displayed in a user interface, that is displayed on the display of the device, of the application.

13. The method of claim 1, further comprising:
receiving second input corresponding to selection of a color for the category of elements;
displaying a grid view within the avatar editing environment, at least one cell in the grid view displaying different colors associated with the category of elements;
associating the second input with a cell; and
selecting a color based on the associating.

14. A computer-implemented method performed by one or more processors, comprising:
presenting, on a touch sensitive display of a mobile device, an avatar editing environment, the avatar editing environment concurrently displaying, within the avatar editing environment:
a three-dimensional (3D) avatar model including a first element selected from a category of elements; and
an element picker affordance;
receiving a first input corresponding to selection of the element picker affordance; and
in response to receiving the first, displaying, within the avatar editing environment:
a first 3D representation of the 3D avatar model with a second element from the category of elements, wherein the second element is different from the first element; and
a second 3D representation of the 3D avatar model with a third element from the category of elements, wherein the third element is different from the first element and the second element.

15. The method of claim 14, where displaying, within the avatar editing environment, the first 3D representation of the 3D avatar model and the second 3D representation of the 3D avatar model comprises:
displaying, within the avatar editing environment, a 3D texture representing the second element from the category of elements and the third element from the category of elements.

16. The method of claim 14, further comprising:
receiving a second input corresponding to selection of one of the first 3D representation of the 3D avatar model and the second 3D representation of the 3D avatar model;
in response to receiving the second input, displaying, in the avatar editing environment, the first 3D representation of the 3D avatar model or the second 3D representation of the 3D avatar model; and
receiving, within the avatar editing environment, a third input corresponding to manual editing of the displayed first 3D representation of the 3D avatar model or the second 3D representation of the 3D avatar model.

17. A system for editing avatars, comprising:
one or more processors; and
a computer-readable medium coupled to the one or more processors and storing instructions, which, when executed by the one or more processors, causes the one or more processors to perform operations, comprising:
presenting, on a display of a device, an avatar editing environment, the avatar editing environment concurrently displaying, within the avatar editing, environment:
an avatar model including a first element selected from a category of elements; and
an element picker affordance;
receiving a first input corresponding to selection of the element picker affordance; and
in response to receiving the first input, displaying, within the avatar editing environment:
a first representation of the avatar model with a second element from the category of elements, wherein the second element is different from the first element; and
a second representation of the avatar model with a third element from the category of elements, wherein the third element is different from the first element and the second element.

18. The system of claim 17, where the system is a mobile device and the display is a touch sensitive display.

19. The system of claim 18, where the first input is a touch input or gesture received on the touch sensitive display.

20. The system of claim 18, where the computer-readable medium stores instructions, which when executed by the one or more processors, causes the one or more processors to perform operations, comprising:
displaying a bar within the avatar editing environment, the bar containing a number of icons representing different categories of elements; and
applying a touch input to the bar on the display to animate the icons, the animation simulating motion of the icons through a center position of the bar, where the icon occupying the center position of the bar when the motion stops represents the category of elements.

* * * * *

UNITED STATES PATENT AND TRADEMARK OFFICE
CERTIFICATE OF CORRECTION

PATENT NO. : 10,607,419 B2
APPLICATION NO. : 14/866560
DATED : March 31, 2020
INVENTOR(S) : Marcel Van Os et al.

Page 1 of 1

It is certified that error appears in the above-identified patent and that said Letters Patent is hereby corrected as shown below:

In the Claims

In Column 22, Line 11, Claim 1, delete "editing," and insert -- editing --, therefor.

In Column 24, Line 29, Claim 17, delete "editing," and insert -- editing --, therefor.

Signed and Sealed this
Eleventh Day of March, 2025

Coke Morgan Stewart
*Acting Director of the United States Patent and Trademark Office*